(12) United States Patent
Kageta

(10) Patent No.: US 9,686,434 B2
(45) Date of Patent: Jun. 20, 2017

(54) SCANNER DEMONSTRATOR, METHOD OF SCANNER DEMONSTRATION, AND COMPUTER PROGRAM PRODUCT

(71) Applicant: PFU LIMITED, Ishikawa (JP)

(72) Inventor: Yukihiro Kageta, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/626,621

(22) Filed: Feb. 19, 2015

(65) Prior Publication Data

US 2016/0127594 A1    May 5, 2016

(30) Foreign Application Priority Data

Oct. 31, 2014    (JP) .................................. 2014-223683

(51) Int. Cl.
H04N 1/04        (2006.01)
H04N 1/00        (2006.01)

(52) U.S. Cl.
CPC .............................. *H04N 1/00962* (2013.01)

(58) Field of Classification Search
CPC .................................................. H04N 1/00962
USPC ................. 358/474, 498, 497, 496
See application file for complete search history.

(56) References Cited

U.S. PATENT DOCUMENTS

2010/0005136 A1*  1/2010  Ferlitsch ........... G06F 17/30876
                                                            709/203

FOREIGN PATENT DOCUMENTS

| JP | 02-165351 A | 6/1990 | |
|---|---|---|---|
| JP | 05-334127 A | 12/1993 | |
| JP | 1995-105069 | * 4/1995 | ............. G06F 12/00 |
| JP | 2002-007483 A | 1/2002 | |
| JP | 2002-259162 A | 9/2002 | |
| JP | 2003-280940 A | 10/2003 | |
| JP | 2007-011737 A | 1/2007 | |
| JP | 2010-045781 A | 2/2010 | |
| JP | 2012-032567 A | 2/2012 | |
| JP | 2012-038162 A | 2/2012 | |

OTHER PUBLICATIONS

Decision of Patent Grant Japanese Patent Application No. 2014-223683 dated Dec. 1, 2015 with full English translation.

* cited by examiner

*Primary Examiner* — Houshang Safaipour
(74) *Attorney, Agent, or Firm* — McDermott Will & Emery LLP

(57) ABSTRACT

Provided are a scanner demonstrator, a method of scanner demonstration, and a computer program product that can easily perform a demonstration having high reproducibility and presence even without a scanner device. The scanner demonstrator outputs image data read by a scanner device in an environment not connected to the scanner device, based on device status information of the scanner device at image reading.

20 Claims, 24 Drawing Sheets

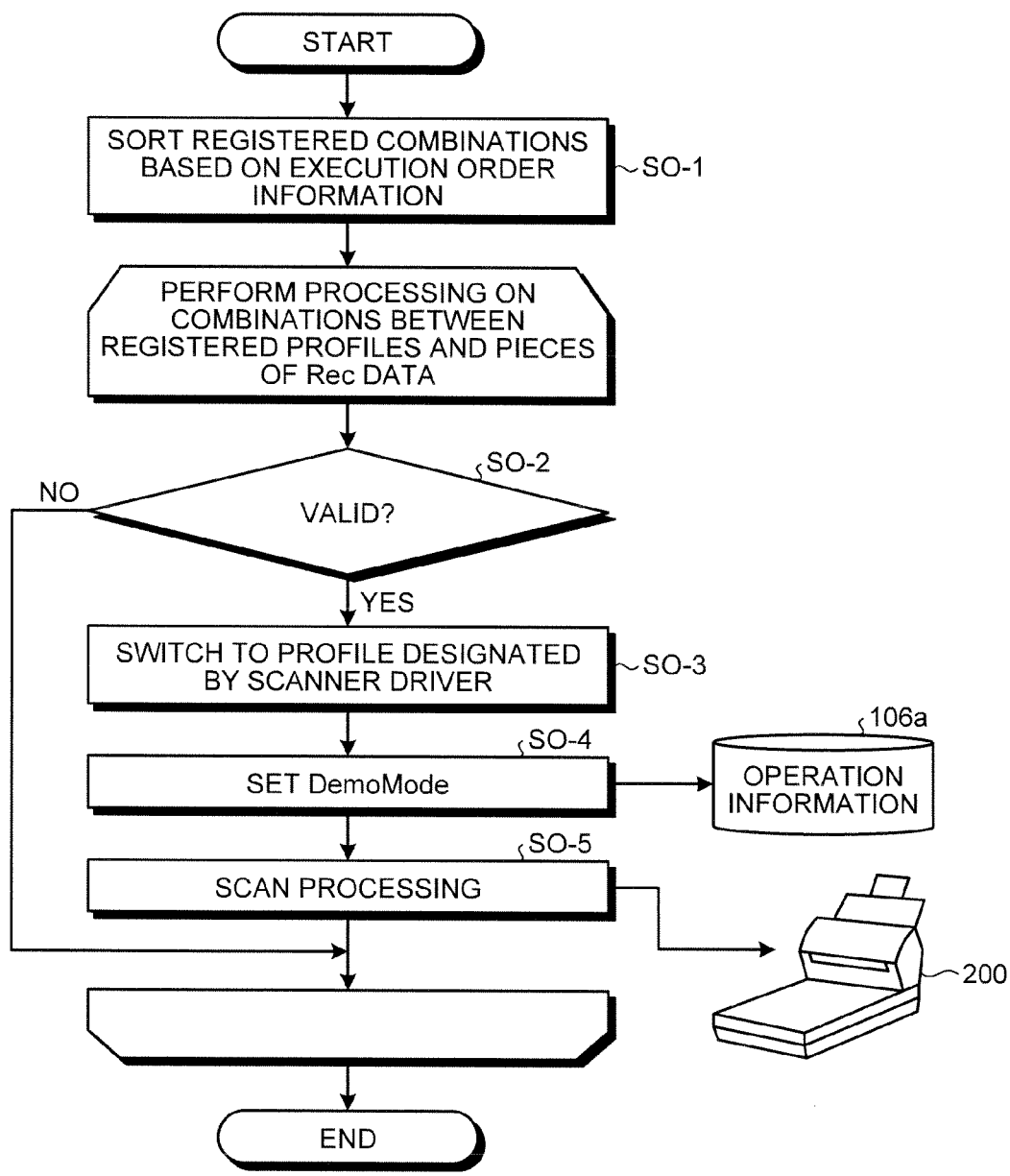

SCANNER DEMONSTRATOR, METHOD OF SCANNER DEMONSTRATION, AND COMPUTER PROGRAM PRODUCT

CROSS-REFERENCE TO RELATED APPLICATION

This application is based upon and claims the benefit of priority from Japanese Patent Application No. 2014-223683, filed on Oct. 31, 2014, the entire contents of which are incorporated herein by reference.

BACKGROUND OF THE INVENTION

1. Field of the Invention

The present disclosure relates to a scanner demonstrator, a method of scanner demonstration, and a computer program product.

2. Description of the Related Art

Techniques that perform simulations have been disclosed.

A technique is disclosed that supports software development facilitating the reproduction of hardware operation (refer to JP-A-2002-259162).

A technique is disclosed that records and reproduces key data input information (refer to JP-A-2-165351).

A debug system is disclosed that records input signals or input data from an external device using an actual device and can reproduce a state in which the external device is connected in real time even when the external device is not connected (refer to JP-A-2003-280940).

A technique is disclosed that can execute a computer program that requires the execution of input/output instructions to and from an input/output device in an information processing system in which the input/output device for which the input/output instructions are executed is not present (refer to JP-A-5-334127).

However, the conventional systems (refer to JP-A-2002-259162, for example) have a problem in that when a demonstration of a driver or an application using a scanner device is performed, device status information is not collected, and functionality that can be implemented only by a specific scanner device or the like is not performed. In view of this situation, when a demonstration is performed, the conventional systems require to prepare a scanner device adapted to the demonstration.

SUMMARY OF THE INVENTION

It is an object of the present disclosure to at least partially solve the problems in the conventional technology.

A scanner demonstrator according to one aspect of the present disclosure includes a device information storage unit that stores image data read by a scanner device and device status information of the scanner device at image reading, and a pseudo-scanner unit that outputs the image data in an environment not connected to the scanner device, based on the device status information.

A method of scanner demonstration according to another aspect of the present disclosure includes a pseudo-scanner step of outputting image data read by a scanner device in an environment not connected to the scanner device, based on device status information of the scanner device at image reading.

A computer program product according to still another aspect of the present disclosure is a computer program product having a non-transitory tangible computer readable medium including programmed instructions for causing, when executed by a computer, the computer to perform a method of scanner demonstration including a pseudo-scanner step of outputting image data read by a scanner device in an environment not connected to the scanner device, based on device status information of the scanner device at image reading.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 28 is a flowchart showing an example of processing in the scanner demonstrator according to the present embodiment.

DETAILED DESCRIPTION OF THE EXEMPLARY EMBODIMENTS

The following explains an embodiment of a scanner demonstrator, a method of scanner demonstration, and a computer program product according to the present disclosure in detail with reference to the drawings. This embodiment does not limit the present disclosure.

Configuration of the Present Embodiment

The following explains an example of the configuration of a scanner demonstrator 100 according to an embodiment of the present disclosure with reference to FIG. 1 through FIG. 6 and then explains processing and the like of the present embodiment in detail. Note that the following embodiment exemplifies the scanner demonstrator 100 for embodying the technical idea of the present disclosure, there is no intention to limit the present disclosure to this scanner demonstrator 100, and the present disclosure can be equally applied to the scanner demonstrator 100 of another embodiment included in what is claimed.

Figure 1:
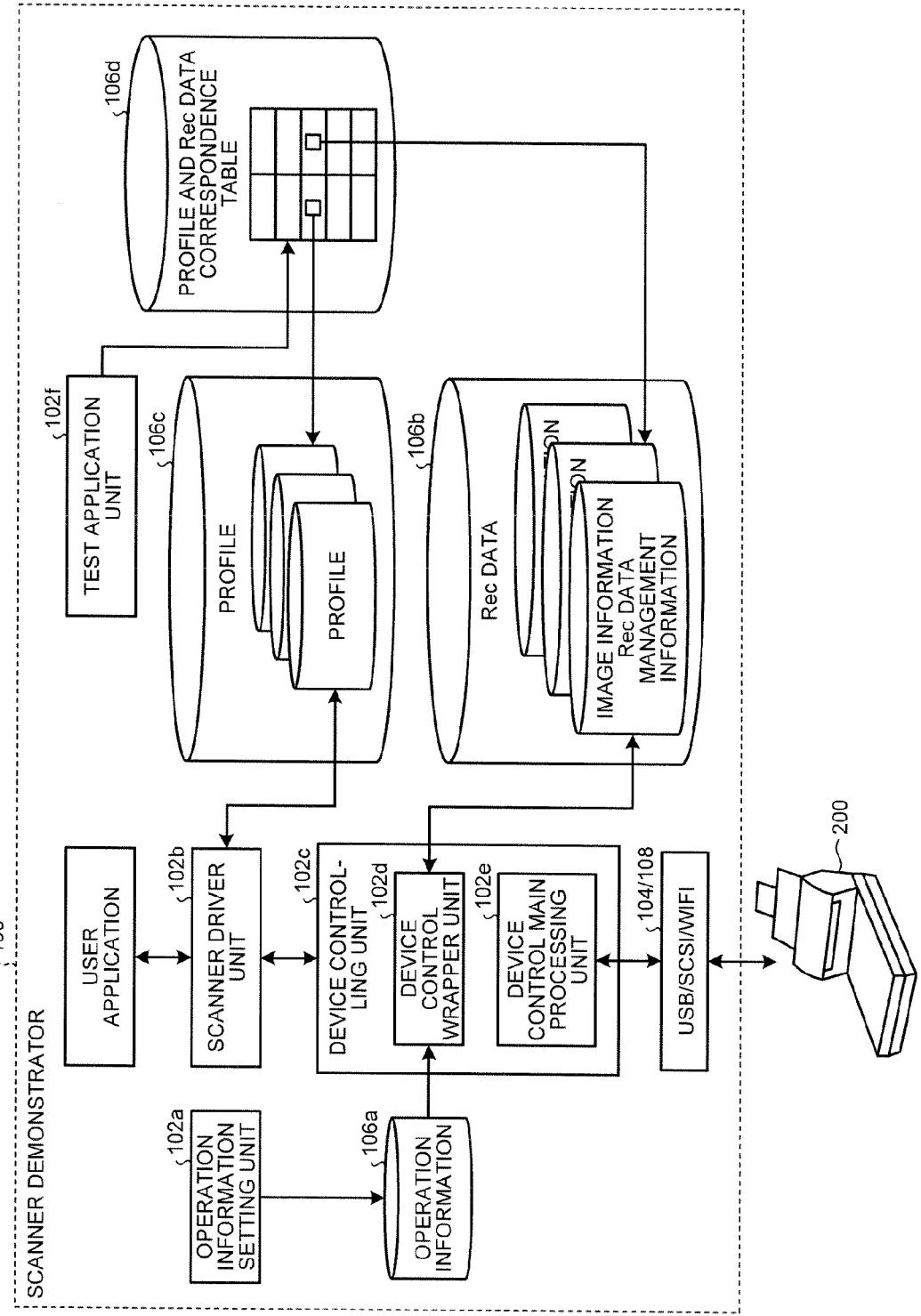
FIG. 1 is an overall configuration diagram showing an example of the configuration of a scanner demonstrator according to a present embodiment.

For example, the form of functional distribution in the scanner demonstrator 100 exemplified by the present embodiment is not limited to the following one and can be configured through functional or physical distribution and integration by an arbitrary unit to the extent that similar effects and functions can be produced. FIG. 1 is an overall configuration diagram showing an example of the configuration of the scanner demonstrator 100 according to the present embodiment.

As shown in FIG. 1, the scanner demonstrator 100 according to the present embodiment is generally communicably connected to a scanner device 200. The communication includes, as an example, remote communication including any one or both of wired communication and wireless communication (WiFi (registered trademark), for example) via a network 300 (not shown in FIG. 1). The respective units of the scanner demonstrator 100 are communicably connected via any communication path.

The scanner device 200 may be a document scanner device of the manual insertion document feeding type (the continuous document feeding (CDF) type), a document scanner device of the automatic document feeding type (the ADF type), a flatbed type document scanner device, an overhead type image-reading apparatus, or the like.

The scanner demonstrator 100 generally includes a control unit 102, a storage unit 106, and an input/output unit 112 (not shown in FIG. 1). The scanner demonstrator 100 may further include an input/output interface unit 108 that connects the input/output unit 112 and the control unit 102.

The scanner device 200 and the control unit 102 of the scanner demonstrator 100 may be connected via the input/output interface unit 108 (USE or SCSI, for example).

The scanner demonstrator 100 may further include a communication interface unit 104 and may be mutually communicably connected with an external device (the scanner device 200, for example) via the communication interface unit 104. The communication interface unit 104 is an interface connected to a communication apparatus such as any one or both of an antenna and a router connected to any one or both of a communication line and a telephone line and may have a function of performing communication control between the scanner demonstrator 100 and the network 300.

The communication interface unit 104 may be a network interface card (NIC) or the like. These units are communicably connected via any communication path. The control unit 102 may control the communication interface unit 104, the input/output interface unit 108, and the input/output unit 112.

The storage unit 106 stores any one, some, or all of various kinds of databases, tables, and files (an operation information file 106a, a device information folder 106b, a profile database 106c, a profile correspondence table 106d, and the like). The storage unit 106 may store various kinds of application programs (user applications, for example).

The storage unit 106, which is a storage unit, can be, for example, any one, some, or all of a memory such as a RAM and a ROM, a fixed disk device such as a hard disk, a solid state drive (SSD), a flexible disk, and an optical disk. The storage unit 106 records a computer program for giving instructions to a central processing unit (CPU) and performing various kinds of processing or the like.

Among the components of the storage unit 106, the operation information file 106a stores operation information of the scanner demonstrator 100.

Figure 2:
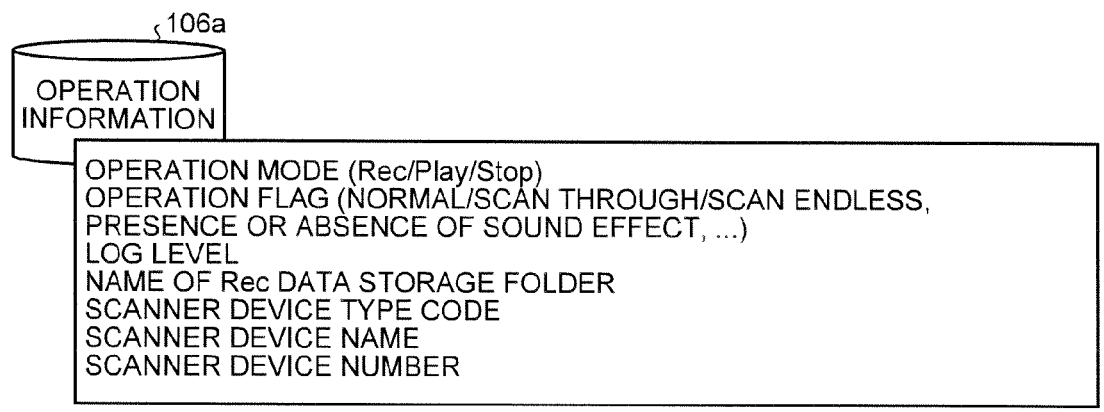
FIG. 2 is a diagram showing an example of the data structure of operation information according to the present embodiment.

The following explains an example of the data structure of the operation information according to the present embodiment with reference to FIG. 2. FIG. 2 is a diagram showing an example of the data structure of the operation information according to the present embodiment.

As shown in FIG. 2, the operation information stored in the operation information file 106a may contain information on the setting of an operation mode (Rec mode/Play mode/Stop mode), the name of a Rec data storage folder, a log (collection) level for debugging or the like, target device information (any one, some, or all of a scanner device type code, a scanner device name, and a scanner device number), and detailed settings of Play mode (operation flags including any one, some, or all of a reproduction mode: normal/scan through/scan endless, scan speed adjustment, and the presence or absence of a sound effect).

Returning back to FIG. 1, the device information folder 106b stores Rec data containing image data read by the scanner device 200 and device status information of the scanner device 200 at image reading. The device status information may contain any one or both of device error information and device sensor information (the presence or absence of ADF sheets or the like).

Rec data may contain not only image data of any one or both of non-compressed data and compressed data such as JPEG but also image information including any one or both of image attribute information (compression format, resolution, vertical and horizontal sizes, sheet feeding information (ADF front/ADF back/FB)) and attribute information such as reading time.

Rec data contains Rec data management information that records and manages any one or both of recording times of Rec data and requests to scan device control and response results. According to the present embodiment, the Rec data management information may contain the device status information.

The Rec data management information may contain device operation information including any one, some, or all of a device type code, a device number, resolution, device ROM information (device EEPROM information), and the presence or absence of ADF/FB.

Figure 3:
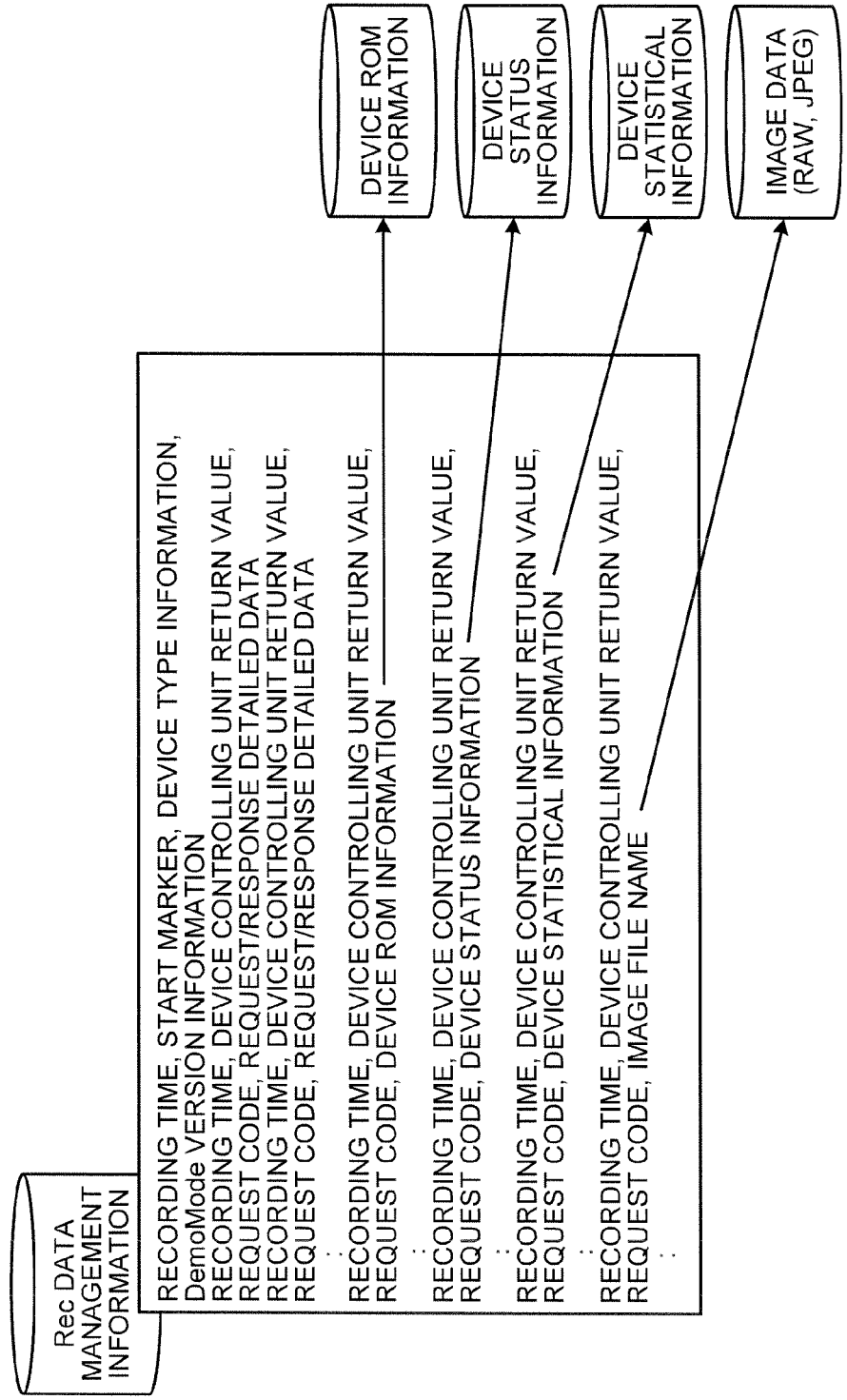
FIG. 3 is a diagram showing an example of the data structure of Rec data according to the present embodiment.

The following explains an example of the data structure of Rec data according to the present embodiment with reference to FIG. 3. FIG. 3 is a diagram showing an example of the data structure of Rec data according to the present embodiment.

As shown in FIG. 3, the Rec data management information contained in Rec data stored in the device information folder 106b may store the correspondence between respective pieces of data (device ROM information, device status information, device statistical information, or image data, for example) contained in Rec data and recording time or the like.

The Rec data management information may contain any one, some, or all of recording time, a start marker, device type information (a device type code), DemoMode version information, a device controlling unit return value, a request code, request/response detailed data, device ROM information, device (detailed) status information, device statistical information, and an image file name.

Returning back to FIG. 1, the profile database 106c stores a profile on a setting of the scanner device 200 at reading. The profile may be data (a file, for example) holding the setting of a scanner driver of the scanner device 200 at scanning.

The profile correspondence table 106d stores a table (correspondence table) that defines the correspondence between profiles and pieces of Rec data corresponding to the respective profiles.

Figure 4:
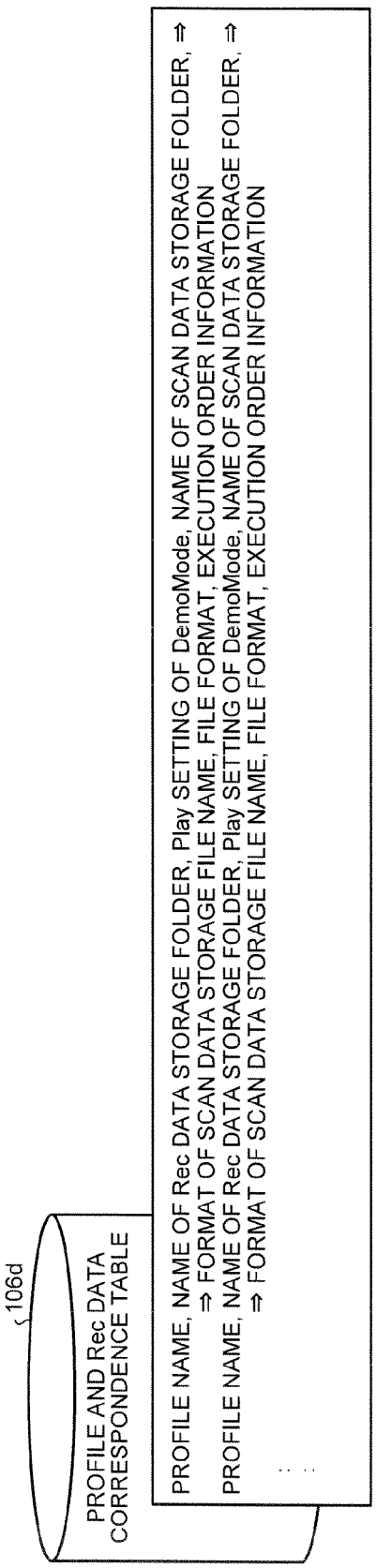
FIG. 4 is a diagram showing an example of the data structure of a profile and Rec data correspondence table according to the present embodiment.

The following explains an example of the data structure of the profile and Rec data correspondence table according to the present embodiment with reference to FIG. 4. FIG. 4 is a diagram showing an example of the data structure of the profile and Rec data correspondence table according to the present embodiment.

As shown in FIG. 4, the profile and Rec data correspondence table may record any one, some, or all of the name of a Rec data storage folder, Play setting of DemoMode, the name of a scan data storage folder, the format of a scan data storage file name, a file format, and execution order information in association with a profile name of the scanner driver.

The storage unit 106 may store various kinds of application programs (user applications, for example).

The input/output unit 112 performs the inputting and outputting (I/O) of data. The input/output unit 112 may be, for example, a key input unit, a touch panel, a control pad (a touch pad or a game pad, for example), a mouse, a keyboard, or a microphone. The input/output unit 112 may be a display unit (a display, a monitor, or a touch panel including liquid crystals or organic EL, for example) that displays a display screen of an application or the like. The input/output unit 112 may be a voice output unit (a speaker, for example) that outputs voice information as a voice.

The control unit 102 includes a CPU that collectively controls the scanner demonstrator 100. The control unit 102 includes an internal memory for storing a control program, a computer program that prescribes various kinds of processing procedures, and required data and performs information processing for executing various kinds of processing based on these computer programs.

The control unit 102 roughly includes an operation information setting unit 102a, a scanner driver unit 102b, a device controlling unit 102c, a device control wrapper unit 102d, a device control main processing unit 102e, and a test application unit 102f.

The operation information setting unit 102a executes an application program that sets the operation information to be a specific profile based on designation by a user. The specific profile may be the operation information file 106a.

The scanner driver unit 102b acquires any one or both of image information and device status information from the device control wrapper unit 102d and performs image processing or the like. The scanner driver unit 102b may acquire any one or both of the image information and the device status information from the device control wrapper unit 102d based on instructions from various kinds of application programs (user applications), perform image processing and the like, and provide images to the application program.

The user application is an application program for using the scanner device 200 used by the user. The user application may cause the scanner device 200 to read image data using the scanner driver.

The device controlling unit 102c acquires the image information and the device status information. The device controlling unit 102c includes at least the device control wrapper unit 102d and the device control main processing unit 102e.

The device control wrapper unit 102d performs processing on the image data read by the scanner device 200. The device control wrapper unit 102d may be a pseudo-scanner unit or an image storing unit. The device control wrapper unit 102d may output image data in an environment not connected to the scanner device 200 based on the device status information.

The device control wrapper unit 102d may acquire the image data read by the scanner device 200 and the device status information and store the same in the device information folder 106b. The device control wrapper unit 102d may further output a sound effect corresponding to an operation of the scanner device 200 based on the device status information.

The device control wrapper unit 102d may output the image data in accordance with an operation of the scanner device 200 at reading in an environment not connected to the scanner device 200 based on the device status information. The device control wrapper unit 102d may output the image data in accordance with a reading operation of the scanner device 200 at reading in an environment not connected to the scanner device 200 based on the device status information.

The device control wrapper unit 102d may continuously output the image data with a reading completion operation of the scanner device 200 at reading removed in an environment not connected to the scanner device 200 based on the device status information. The device control wrapper unit 102d may further output the image data not in synchronization with the speed of the reading operation.

The device control wrapper unit 102d may be arranged every time processing is started. The device control wrapper unit 102d may be conceptually arranged in between the scanner driver unit 102b and the device controlling unit 102c.

The device control wrapper unit 102d in Rec mode (an image reading mode) may record any one or both of the image information and the device status information transmitted and received between the scanner driver unit 102b and the device controlling unit 102c as a file in a specific directory (device information folder 106b).

The device control wrapper unit 102d in Play mode (a demonstration mode) may emulate an operation of the device controlling unit 102c using any one or both of the image information and the device status information recorded in the specific directory (the device information folder 106b).

Figure 5:
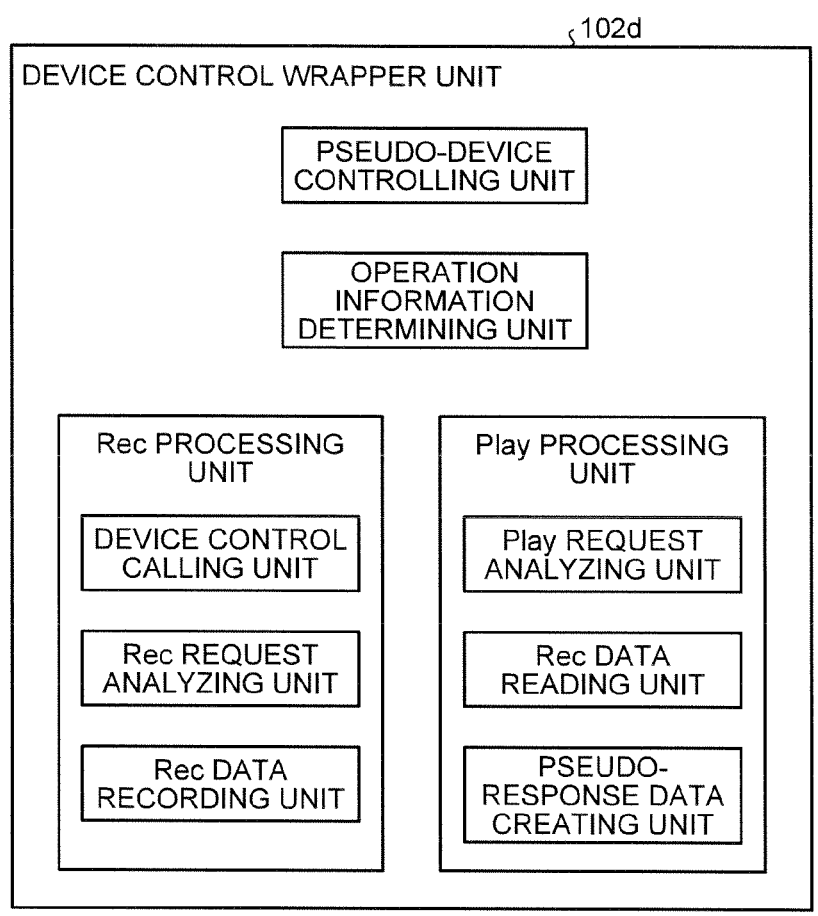
FIG. 5 is a structural diagram showing an example of the configuration of a device control wrapper unit according to the present embodiment.

The following explains an example of the structure of the device control wrapper unit 102d according to the present embodiment with reference to FIG. 5. FIG. 5 is a structural diagram showing an example of the configuration of the device control wrapper unit 102d according to the present embodiment.

As shown in FIG. 5, the device control wrapper unit 102d may roughly include a pseudo-device controlling unit as an interface connecting to the respective units of the scanner demonstrator 100, an operation information determining unit that determines the operation information, a Rec processing unit that performs the processing in Rec mode, and a Play processing unit that performs the processing in Play mode.

The Rec processing unit may include a device control calling unit that calls the device control main processing unit 102e, a Rec request analyzing unit that analyzes operation information required for Rec mode, and a Rec data recording unit that stores Rec data in the device information folder 106b.

The Play processing unit may include a Play request analyzing unit that analyzes operation information required for Play mode, a Rec data reading unit that acquires (reads) Rec data stored in the device information folder 106b, and a pseudo-response data creating unit that creates output data to be output in Play mode.

Returning back to FIG. 1, the device control main processing unit 102e communicates with the scanner device 200 via the communication interface unit 104 or the input/output interface unit (USB, SCSI, or the like) 108 and acquires Rec data containing the image information and the device status information from the scanner device 200.

The test application unit 102f acquires a scan setting that associates the profile and the device status information with each other and performs a test on the scan setting based on the scan setting. The test application unit 102f may be a scan testing unit.

The test application unit 102f may acquire the scan setting that associates the profile and the device status information with each other and cause the scanner device 200 to read image data based on the scan setting, thereby performing the test on the scan setting.

The test application unit 102f may automatically execute scan processing in the scanner device 200 while automatically switching Rec data and the profile of the driver based on the profile correspondence table 106d defined in advance, thereby performing the test (an application program for testing) on the scan setting.

Figure 6:
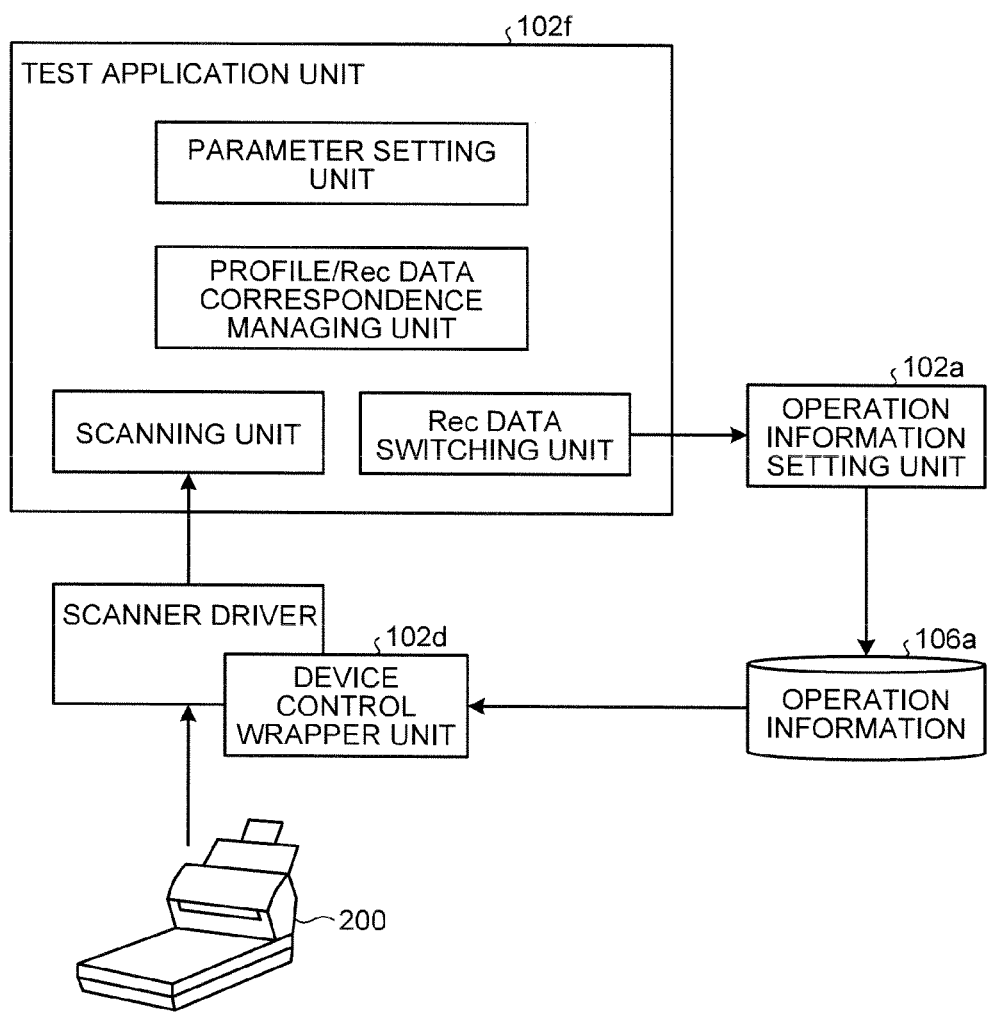
FIG. 6 is a structural diagram showing an example of the structure of a test application unit according to the present embodiment.

The following explains an example of the structure of the test application unit 102f according to the present embodiment with reference to FIG. 6. FIG. 6 is a structural diagram showing an example of the structure of the test application unit 102f according to the present embodiment.

As shown in FIG. 6, the test application unit 102f may include a parameter setting unit that provides a user interface for causing a user to set a parameter on a scan test.

The test application unit 102f may include a profile/Rec data correspondence managing unit that manages the profile correspondence table 106d, a scanning unit that performs scan processing by the scanner device 200, and a Rec data switching unit that switches between Rec data and the profile of the scanner driver based on the profile correspondence table 106d at the time of executing scan processing.

The test application unit 102f may set a profile holding the setting of the scanner driver in the scanner driver and cause the operation information setting unit (an operation information setting tool) 202a to set the operation information (the operation information stored in the operation information file 106a) for using Rec data associated with the profile in Play mode executed by the device control wrapper unit 102d.

Processing of Present Embodiment

First, an example of processing performed by the scanner demonstrator 100 having the above-described configuration will be explained with reference to FIG. 7 through FIG. 28.

Processing by Operation Information Setting Unit 102a

Figure 7:
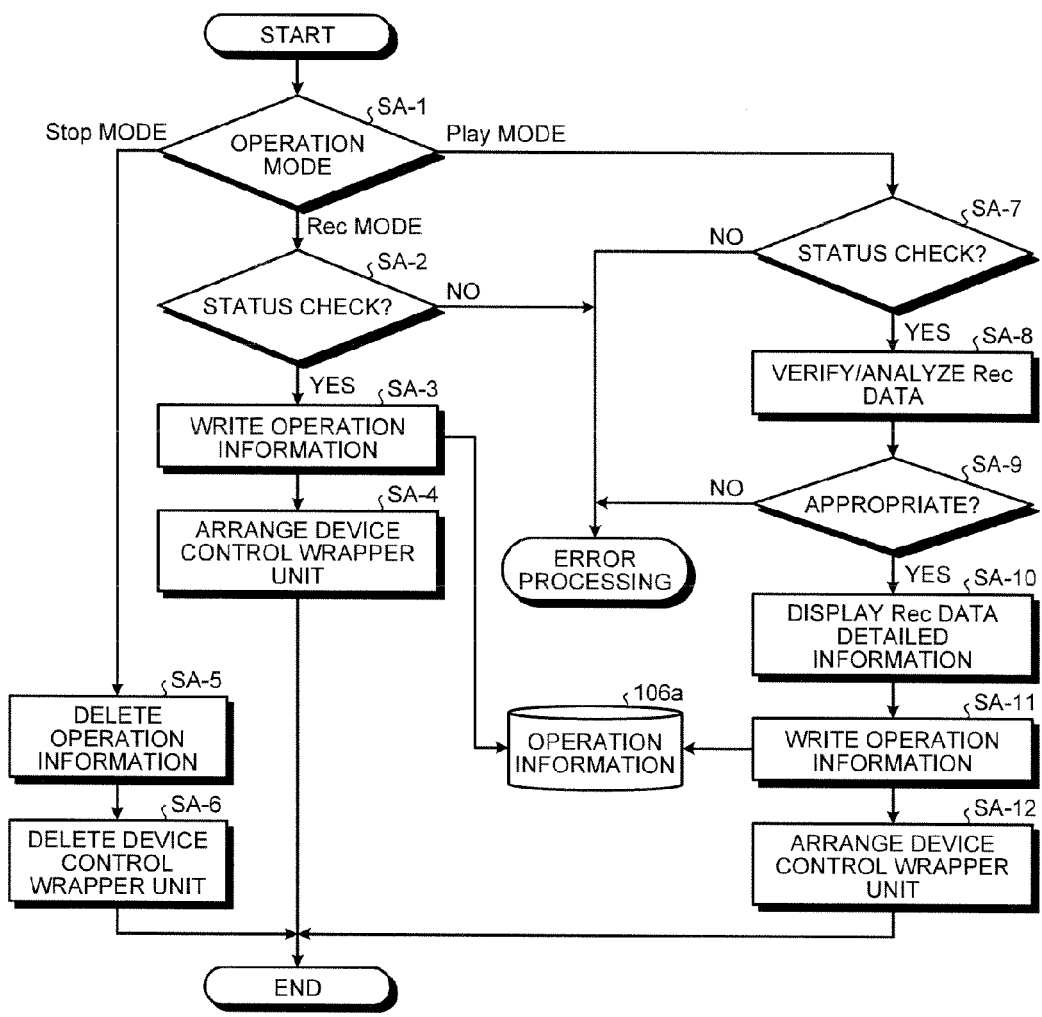
FIG. 7 is a flowchart showing an example of processing in the scanner demonstrator according to the present embodiment.

First, an example of processing by the operation information setting unit 102a according to the present embodiment will be explained with reference to FIG. 7 and FIG. 8. FIG. 7 is a flowchart showing an example of processing in the scanner demonstrator 100 according to the present embodiment.

As shown in FIG. 7, first, when performing a demonstration or a scan test of the scanner device 200, the operation information setting unit 102a determines whether an operation mode contained in the operation information set by the user is Rec mode, Play mode, or Stop mode (Step SA-1).

If the operation information setting unit 102a determines that the operation mode is the Rec mode (Rec mode at Step SA-1), the operation information setting unit 102a shifts the processing to Step SA-2.

The operation information setting unit 102a performs status checks such as whether a Rec data storage folder (the device information folder 106b), which is set in the operation information, in which Rec data is stored is present (whether being designated by the user) and whether the device information folder 106b is empty (is sufficient in storage capacity) (Step SA-2).

If the operation information setting unit 102a determines that the device information folder 106b is absent (not designated by the user) or that the device information folder 106b is not empty (is insufficient in storage capacity) (No at Step SA-2), the operation information setting unit 102a performs error processing to end the processing.

If the operation information setting unit 102a determines that the device information folder 106b is present (designated by the user) and that the device information folder 106b is empty (is sufficient in storage capacity) (Yes at Step SA-2), the operation information setting unit 102a shifts the processing to Step SA-3.

The operation information setting unit 102a writes the set operation information in the operation information file 106a (Step SA-3).

The operation information setting unit 102a arranges the device control wrapper unit 102d in the device controlling unit 102c (Step SA-4) and ends the processing. In other words, the operation information setting unit 102a may set the operation information in a certain place of the storage device and arrange the device control wrapper unit 102*d* in the device controlling unit 102*c*.

If the operation information setting unit 102*a* determines that the operation mode is the Stop mode (Stop mode at Step SA-1), the operation information setting unit 102*a* shits the processing to Step SA-5.

The operation information setting unit 102*a* deletes the operation information stored in the operation information file 106*a* (Step SA-5).

The operation information setting unit 102*a* deletes the device control wrapper unit 102*d* arranged in the device controlling unit 102*c* (Step SA-6) and ends the processing.

If the operation information setting unit 102*a* determines that the operation mode is the Play mode (Play mode at Step SA-1), the operation information setting unit 102*a* shifts the processing to Step SA-7.

The operation information setting unit 102*a* performs status checks such as whether the device information folder 106*b* set in the operation information is present and whether the device information folder 106*b* is empty (Step SA-7).

If the operation information setting unit 102*a* determines that the device information folder 106*b* is absent or that the device information folder 106*b* is empty (No at Step SA-7), the operation information setting unit 102*a* performs the error processing and ends the processing.

If the operation information setting unit 102*a* determines that the device information folder 106*b* is present and that the device information folder 106*b* is not empty (has pre-registered Rec data) (Yes at Step SA-7), the operation information setting unit 102*a* shifts the processing to Step SA-8.

The operation information setting unit 102*a* designates the device information folder 106*b* that has stored the Rec data and performs any one or both of verification and analysis on the Rec data preregistered in the device information folder 106*b* (Step SA-8).

The operation information setting unit 102*a* determines whether the Rec data preregistered in the device information folder 106*b* is appropriate (Step SA-9).

If the operation information setting unit 102*a* determines that the Rec data preregistered in the device information folder 106*b* is inappropriate (No at Step SA-9), the operation information setting unit 102*a* performs the error processing and ends the processing.

If the operation information setting unit 102*a* determines that the Rec data preregistered in the device information folder 106*b* is appropriate (Yes at Step SA-9), the operation information setting unit 102*a* shifts the processing to Step SA-10.

The operation information setting unit 102*a* causes the input/output unit 112 to display detailed information of the Rec data (Step SA-10).

The operation information setting unit 102*a* writes the operation information in the operation information file 106*a* (Step SA-11). The operation information may contain any one, some, or all of an operation flag (normal/scan through/scan endless), the presence or absence of a sound effect, a scanner device type code, and a scanner device name.

The operation information setting unit 102*a* arranges the device control wrapper unit 102*d* in the device controlling unit 102*c* (Step SA-12) and ends the processing.

Thus, in the present embodiment, the operation information setting unit 102*a* may be the operation information setting tool that sets the Rec mode, the Play mode, the Stop mode, the data storage folder, or various detailed setting information as the operation information.

Figure 8:
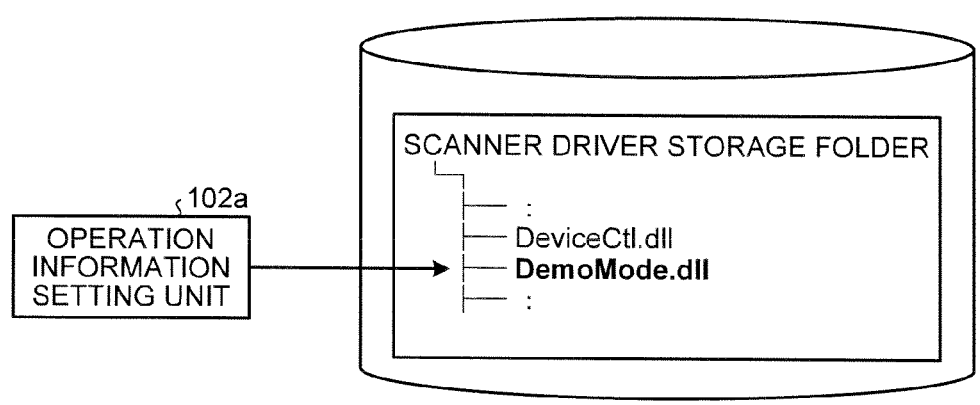
FIG. 8 is a diagram showing an example of the arrangement of the device control wrapper unit according to the present embodiment.

The following explains an example of the arrangement of the device control wrapper unit 102*d* with reference to FIG. 8. FIG. 8 is a diagram showing an example of the arrangement of the device control wrapper unit 102*d* according to the present embodiment.

As shown in FIG. 8, the operation information setting unit 102*a* may arrange the device control wrapper unit 102*d* (DemoMode.dll) below the device controlling unit 102*c* (DeviceCtl.dll) arranged in a scanner driver storage folder (an internal memory of the control unit 102 or the like) or delete the device control wrapper unit 102*d* (DemoMode.dll) arranged in the scanner driver storage folder.

In other words, the operation information setting tool (the operation information setting unit 102*a*) may copy the device control wrapper unit 102*d* (DemoMode.dll) to the scanner driver storage folder in Rec mode or Play mode.

In Stop mode, when the device control wrapper unit 102*d* (DemoMode.dll) is present in the scanner driver storage folder, the operation information setting tool (the operation information setting unit 102*a*) may delete the device control wrapper unit 102*d* (DemoMode.dll).

Device Control Wrapper Unit 102*d* Calling Processing

Figure 9:
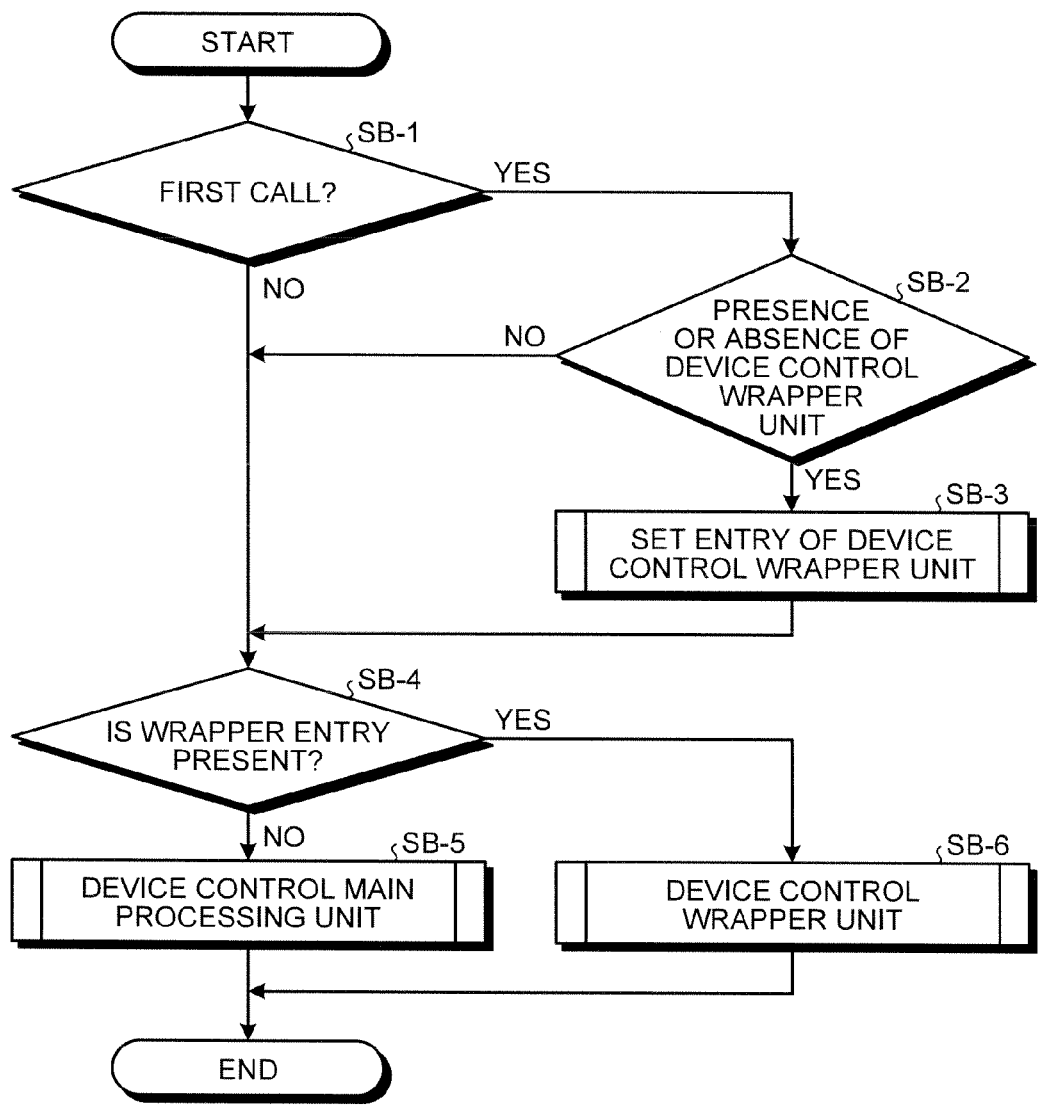
FIG. 9 is a flowchart showing an example of processing in the scanner demonstrator according to the present embodiment.

The following explains an example of device control wrapper unit 102*d* calling processing according to the present embodiment with reference to FIG. 9. FIG. 9 is a flowchart showing an example of processing in the scanner demonstrator 100 according to the present embodiment.

As shown in FIG. 9, first, when the user starts up a user application using the scanner driver, the user application calls the scanner driver, and the called scanner driver calls the device controlling unit 102*c*. The device controlling unit 102*c* determines whether the call by the scanner driver is a first one (Step SB-1).

If the device controlling unit 102*c* determines that the call by the scanner driver is not the first one (a second or later call) (No at Step SB-1), the device controlling unit 102*c* shifts the processing to Step SB-4.

If the device controlling unit 102*c* determines that the call by the scanner driver is the first one (Yes at Step SB-1), the device controlling unit 102*c* shifts the processing to Step SB-2.

The device controlling unit 102*c* determines (checks) the presence or absence of the device control wrapper unit 102*d*, that is, whether the device control wrapper unit 102*d* is being arranged (Step SB-2).

If the device controlling unit 102*c* determines that the device control wrapper unit 102*d* is not arranged (No at Step SB-2), the device controlling unit 102*c* shifts the processing to Step SB-4.

If the device controlling unit 102*c* determines that the device control wrapper unit 102*d* is arranged (Yes at Step SB-2), the device controlling unit 102*c* shifts the processing to Step SB-3.

The device controlling unit 102*c* performs entry setting of the device control wrapper unit 102*d* (Step SB-3) and shifts the processing to Step SB-4.

The device controlling unit 102*c* determines whether entry (wrapper entry) of the device control wrapper unit 102*d* is present (Step SB-4).

If the device controlling unit 102*c* determines that the wrapper entry is absent (No at Step SB-4), the device controlling unit 102*c* shifts the processing to Step SB-5.

The device controlling unit 102*c* changes all subsequent calls (processing calls) to the device controlling unit 102*c* into calls to the device control main processing unit 102*e* and causes the device control main processing unit 102e to perform various kinds of processing (Step SB-5) and ends the processing.

If the device controlling unit 102c determines that the wrapper entry is present (Yes at Step SB-4), the device controlling unit 102c shifts the processing to Step SB-6.

The device controlling unit 102c changes all subsequent calls (processing calls) to the device controlling unit 102c into calls to the device control wrapper unit 102d and causes the device control wrapper unit 102d to perform various kinds of processing (Step SB-6) and ends the processing.

In the present embodiment, the processing by the device control wrapper unit 102d may be the provision of Rec mode that records transmission and reception data between the scanner device 200 and a high-order computer program, Play mode that provides the high-order computer program with image data via a virtual scanner device using the data recorded in Rec mode, and Stop mode that provides non-operation.

In other words, the present embodiment changes all subsequent processing calls to the device controlling unit 102c into processing calls to the device control wrapper unit 102d, if the device control wrapper unit 102d is arranged.

Processing by Device Control Wrapper Unit 102d

Figure 10:
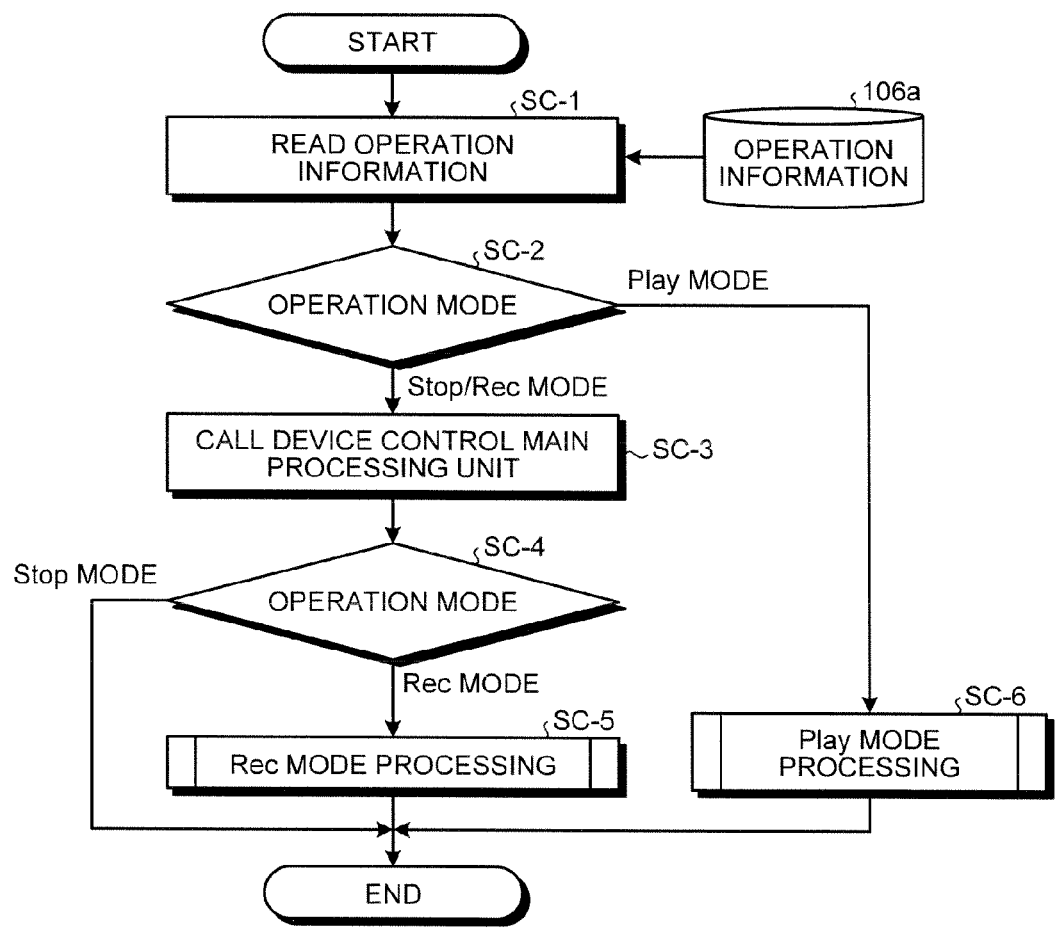
FIG. 10 is a flowchart showing an example of processing in the scanner demonstrator according to the present embodiment.

The following explains an example of processing by the device control wrapper unit 102d with reference to FIG. 10 to FIG. 27. FIG. 10 is a flowchart showing an example of processing in the scanner demonstrator 100 according to the present embodiment.

As shown in FIG. 10, first, the device control wrapper unit 102d checks whether the operation information is stored in a certain place (the operation information file 106a), and when the operation information is stored, reads contents set in the operation information stored in the operation information file 106a (Step SC-1).

The device control wrapper unit 102d determines whether the operation mode set in the operation information is Rec mode, Play mode, or Stop mode (Step SC-2).

If the device control wrapper unit 102d determines that the operation mode set in the operation information is the Rec mode or the Stop mode (Stop/Rec mode at Step SC-2), the device control wrapper unit 102d shifts the processing to Step SC-3.

The device control wrapper unit 102d calls the device control main processing unit 102e (Step SC-3).

The device control wrapper unit 102d determines whether the operation mode set in the operation information is the Rec mode or the Stop mode (Step SC-4).

If the device control wrapper unit 102d determines that the operation mode set in the operation information is the Stop mode (Stop mode at Step SC-4), the device control wrapper unit 102d ends the processing.

If the device control wrapper unit 102d determines that the operation mode set in the operation information is the Rec mode (Rec mode at Step SC-4), the device control wrapper unit 102d shifts the processing to Step SC-5.

The device control wrapper unit 102d executes the Rec mode processing based on the contents set in the operation information (Step SC-5) and ends the processing.

Rec Mode Processing

Figure 11:
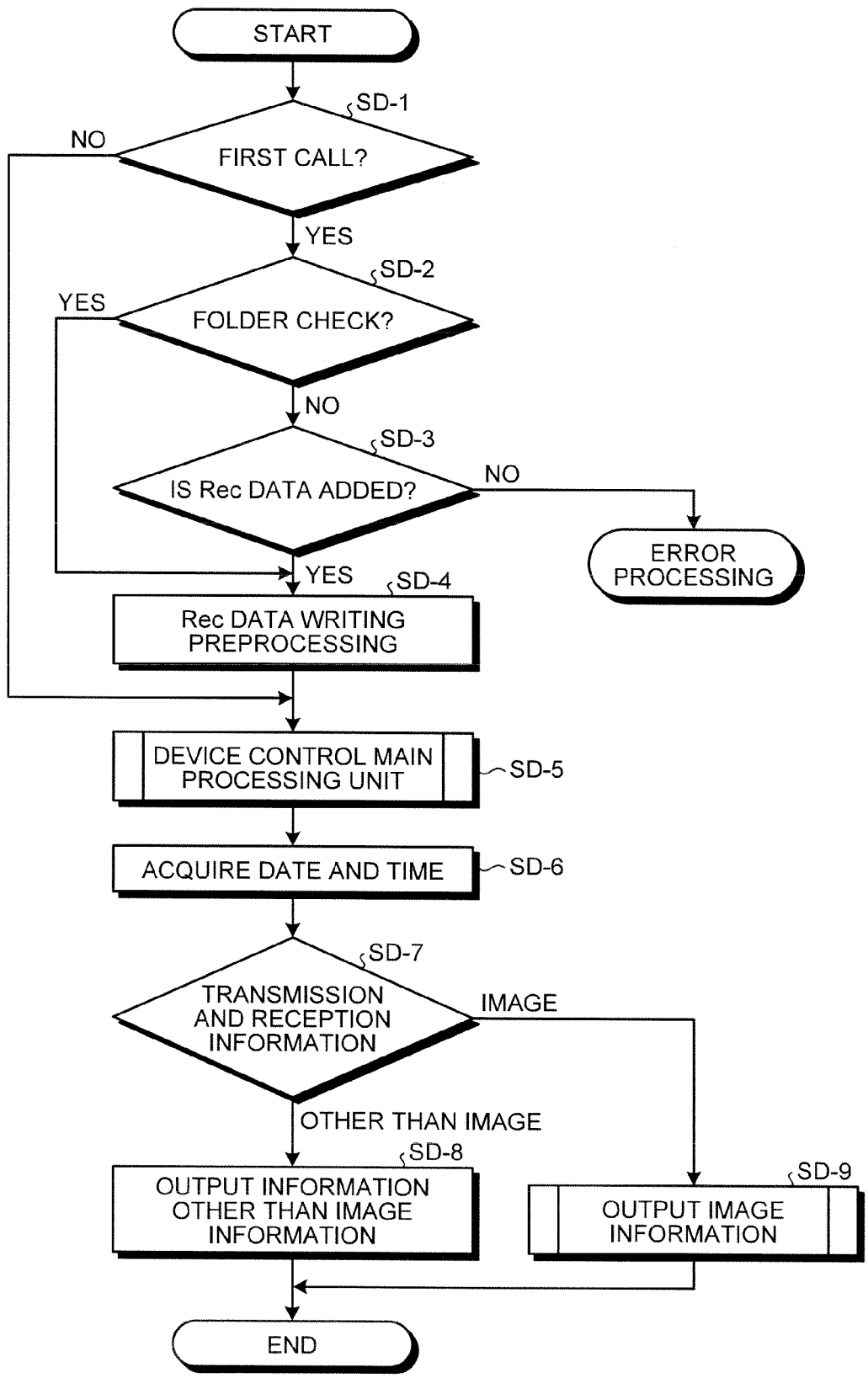
FIG. 11 is a flowchart showing an example of processing in the scanner demonstrator according to the present embodiment.
Figure 12:
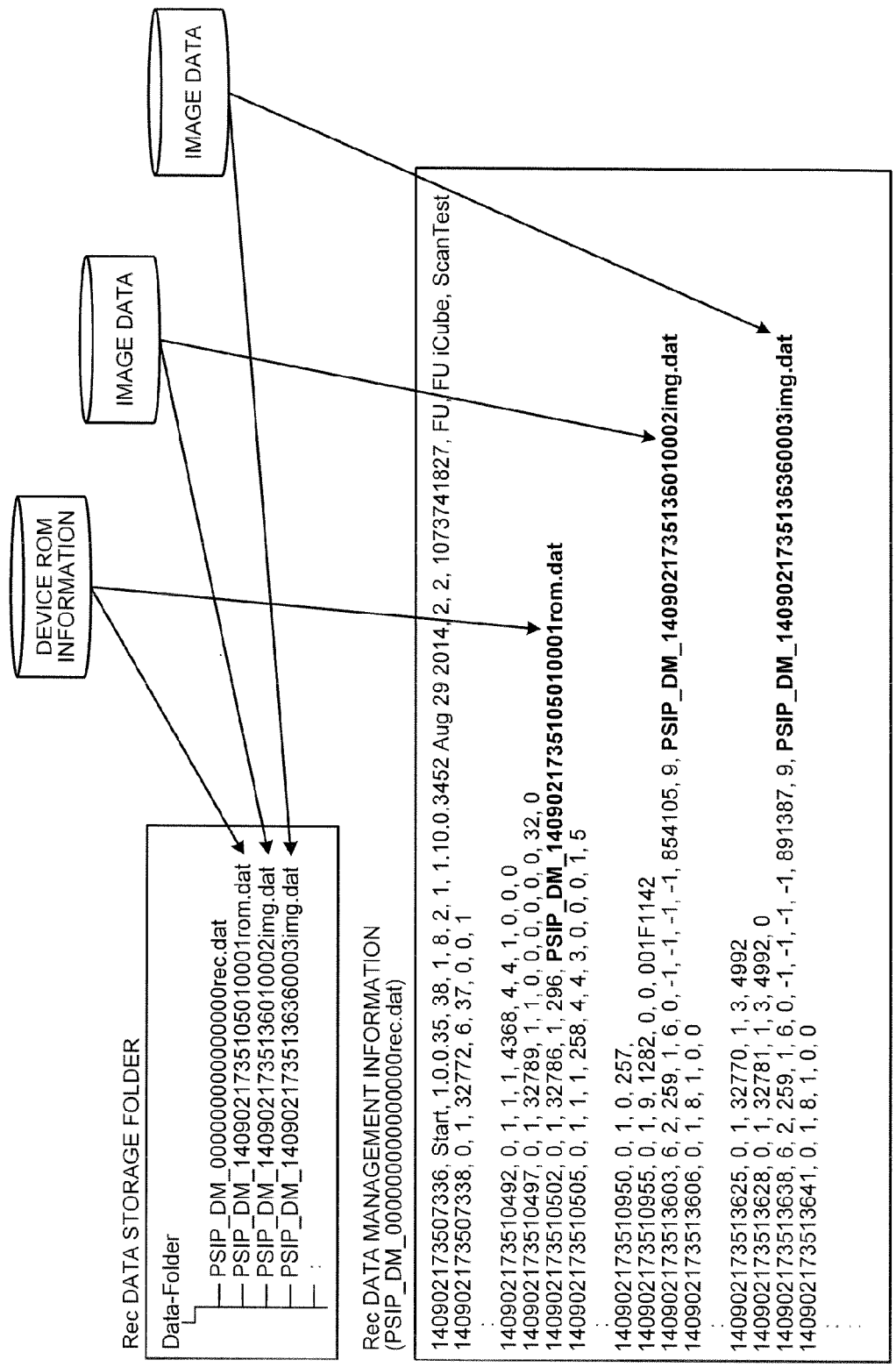
FIG. 12 is a diagram showing an example of Rec data according to the present embodiment.
Figure 13:
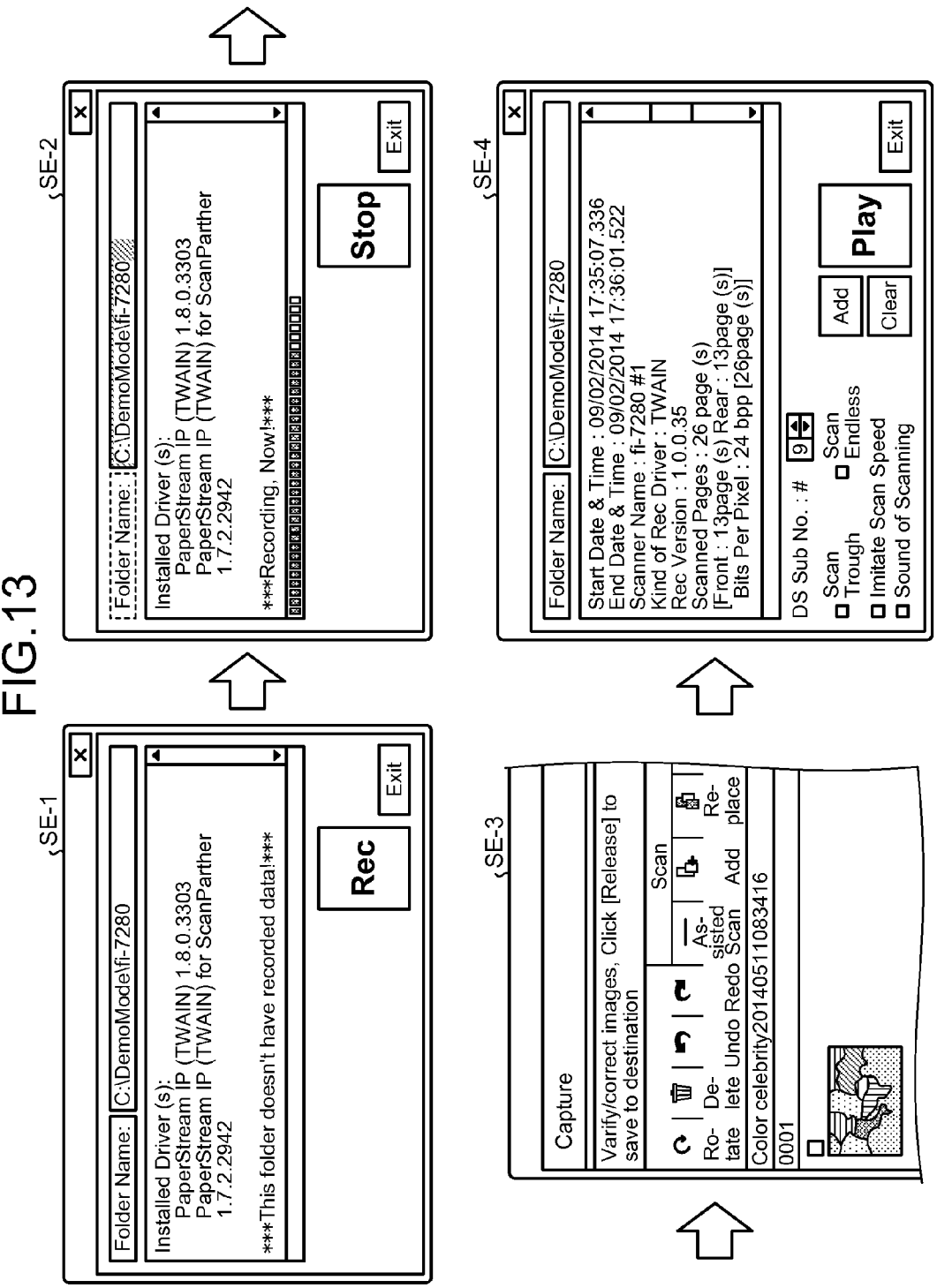
FIG. 13 is a diagram showing an example of a screen when executing Rec mode using an operation information setting tool according to the present embodiment.

The following explains an example of the Rec mode processing according to the present embodiment with reference to FIG. 11 to FIG. 13. FIG. 11 is a flowchart showing an example of processing in the scanner demonstrator 100 according to the present embodiment.

As shown in FIG. 11, the device control wrapper unit 102d calls the device control main processing unit 102e and determines whether the call of the device control main processing unit 102e is a first one (Step SD-1).

If the device control wrapper unit 102d determines that the executed call is not the first one (a second or later call) (No at Step SD-1), the device control wrapper unit 102d shifts the processing to Step SD-5.

If the device control wrapper unit 102d determines that the executed call is the first one (Yes at Step SD-1), the device control wrapper unit 102d shifts the processing to Step SD-2.

The device control wrapper unit 102d performs a folder check whether the device information folder 106b in which Rec data is stored is empty (Step SD-2).

If the device control wrapper unit 102d determines that the device information folder 106b is empty (an empty folder) (Yes at Step SD-2), the device control wrapper unit 102d shifts the processing to Step SD-4.

If the device control wrapper unit 102d determines that the device information folder 106b is not empty (No at Step SD-2), the device control wrapper unit 102d shifts the processing to Step SD-3.

The device control wrapper unit 102d determines whether Rec data can be added to the device information folder 106b (Step SD-3).

If the device control wrapper unit 102d determines that Rec data cannot be added to the device information folder 106b (No at Step SD-3), the device control wrapper unit 102d performs error processing and ends the processing.

If the device control wrapper unit 102d determines that Rec data can be added to the device information folder 106b (Yes at Step SD-3), the device control wrapper unit 102d shifts the processing to Step SD-4.

The device control wrapper unit 102d performs Rec data writing preprocessing (Step SD-4) in the device information folder 106b and shifts the processing to Step SD-5.

The device control wrapper unit 102d controls to cause the device control main processing unit 102e to communicate with the scanner device 200 and to acquire transmission and reception information (any one, some, or all of device ROM information, device status information, device statistical information, and image data) from the scanner device 200 (Step SD-5).

In other words, the device control wrapper unit 102d may cause the device control main processing unit 102e to acquire the device status information of the scanner device 200, the operation setting of the scanner device 200, the image data, and the like.

Thus, the transmission and reception data of the actual scanner device 200 is collected in advance in the operation of the virtual scanner device according to the present embodiment, thereby enabling more accurate emulation of the scanner device 200.

The device control wrapper unit 102d acquires a date and time (Step SD-6). The date and time may be call time, communication time, acquisition time, or the like.

The device control wrapper unit 102d determines whether the transmission and reception information acquired by the device control main processing unit 102e from the scanner device 200 is image data (Step SD-7).

If the device control wrapper unit 102d determines that the transmission and reception data is other than image data (other than image data at Step SD-7), the device control wrapper unit 102d shifts the processing to Step SD-8.

The device control wrapper unit 102d records (outputs) the transmission and reception information together with the acquired date and time in the device information folder 106b designated (set) in the operation information as information other than image information (the Rec data management information) (Step SD-8) and ends the processing.

If the device control wrapper unit 102*d* determines that the transmission and reception information is image data (image data at Step SD-7), the device control wrapper unit 102*d* shifts the processing to Step SD-9.

The device control wrapper unit 102*d* records (outputs) the transmission and reception information together with the acquired date and time in the device information folder 106*b* designated (set) in the operation information as image information (Step SD-9) and ends the processing.

The following explains an example of Rec data according to the present embodiment with reference to FIG. 12. FIG. 12 is a diagram showing an example of Rec data according to the present embodiment.

As shown in FIG. 12, the device information folder 106*b* (Data-Folder) may store Rec data management information (PSIP_DM_000000000000000rec.dat), device ROM information (PSIP_DM_14090217351050100011rom.dat), image data (PSIP_DM_14090217351360100002img.dat), and image data (PSIP_DM_14090217351363600003img.dat).

As shown in FIG. 12, the Rec data management information stored in the device information folder 106*b* may record pieces of management information of the device ROM information (PSIP_DM_14090217351050100011rom.dat), the image data (PSIP_DM_14090217351360100002img.dat), and the image data (PSIP_DM_14090217351363600003img.dat).

The following explains an example of the execution of Rec mode using the operation information setting tool according to the present embodiment with reference to FIG. 13. FIG. 13 is a diagram showing an example of a screen when executing Rec mode using the operation information setting tool according to the present embodiment.

As shown in FIG. 13, when an empty folder (the device information folder 106*b*) is designated by the user, and Rec button is pressed down via the input/output unit 112 (Step SE-1), the scanner demonstrator 100 starts the Rec mode processing (Step SE-2).

The scanner demonstrator 100 starts up an application to be demonstrated, and then the scanner device 200 performs scan processing (Step SE-3).

After the end of the scan processing by the scanner device 200, when the user presses down the Stop button via the input/output unit 112, the scanner demonstrator 100 causes the input/output unit 112 to display outlined information of Rec data stored in the device information folder 106*b* (Step SE-4).

As shown in FIG. 13, the scanner demonstrator 100 causes a scan processing starting date and time (Start Date & Time), a scan processing ending date and time (End Date & Time), a scanner device name (Scanner Name), the kind of driver (Kind of Rec Driver), a version number of the present tool (Rec Version), the number of pages of a scan image acquired by the scan processing (Scanned Pages), bit depth of the scan image (Bits Per Pixel), and the resolution of the scan image (Resolution) to be displayed as the outlined information of Rec data.

Thus, the present embodiment can store Rec data in a user-designated specific folder, thereby enabling Rec data to be easily collected and enabling reproduction examination of trouble, assistance to adjustment of image parameters, or the like to be easily performed without requiring special knowledge.

Returning back to FIG. 10, if the device control wrapper unit 102*d* determines that the operation mode set in the operation information is the Play mode (Play mode at Step SC-2), the device control wrapper unit 102*d* shifts the processing to Step SC-6.

The device control wrapper unit 102*d* performs the Play mode processing based on the contents set in the operation information (Step SC-6) and ends the processing.

Play Mode Processing

Figure 14:
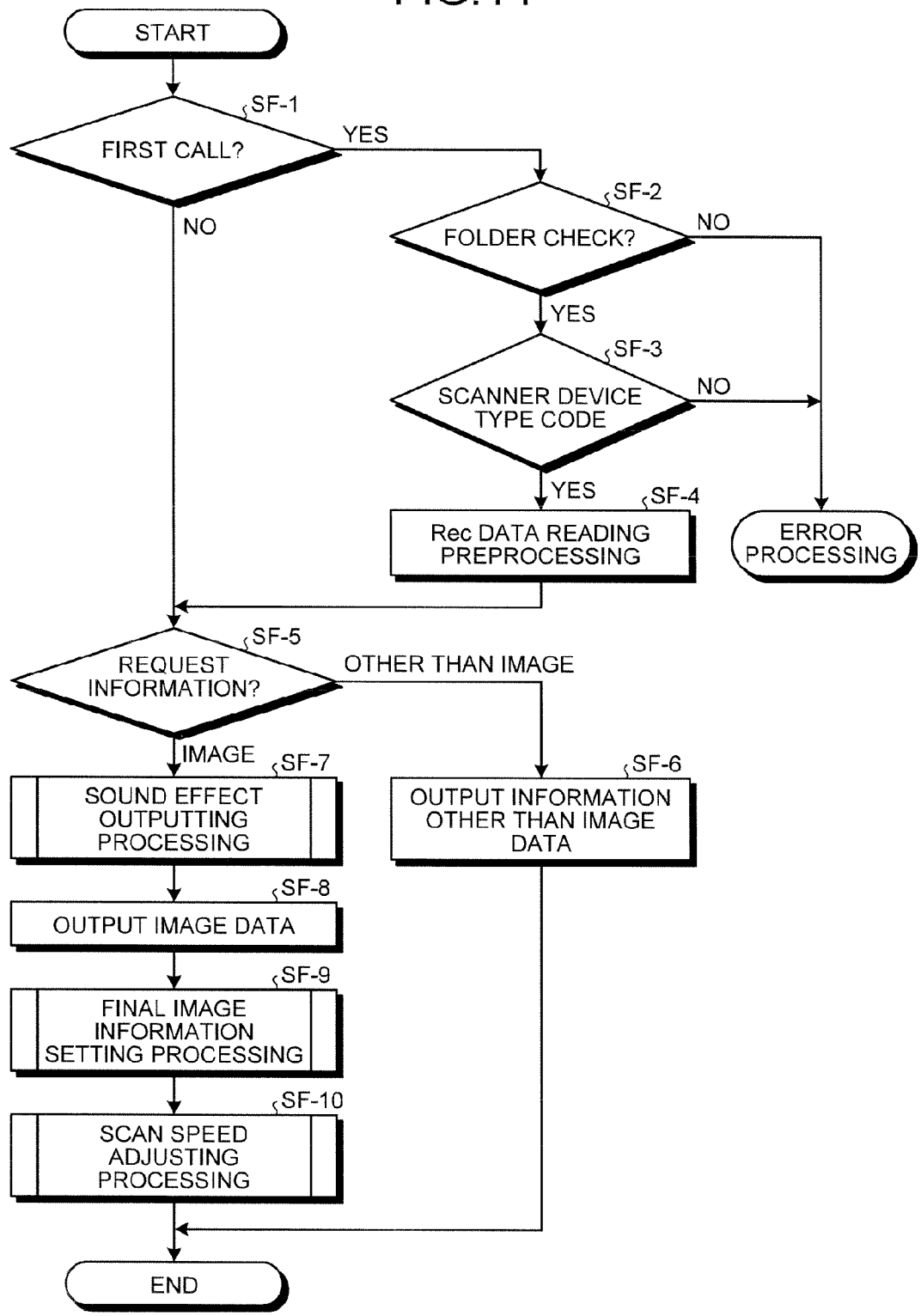
FIG. 14 is a flowchart showing an example of processing in the scanner demonstrator according to the present embodiment.

The following explains an example of the Play mode processing according to the present embodiment with reference to FIG. 14 through FIG. 27. FIG. 14 is a flowchart showing an example of processing in the scanner demonstrator 100 according to the present embodiment.

As shown in FIG. 14, if a demonstration start request is input by the user via the input/output unit 112, the device control wrapper unit 102*d* determines whether the call of the device control wrapper unit 102*d* is a first one (Step SF-1).

If the device control wrapper unit 102*d* determines that the executed call is not the first one (a second or later call) (No at Step SF-1), the device control wrapper unit 102*d* shifts the processing to Step SF-5.

If the device control wrapper unit 102*d* determines that the executed call is the first one (Yes at Step SF-1), the device control wrapper unit 102*d* shifts the processing to Step SF-2.

The device control wrapper unit 102*d* performs a folder check whether the Rec data stored in the device information folder 106*b* is appropriate (Step SF-2).

If the device control wrapper unit 102*d* determines that the Rec data is inappropriate (No at Step SF-2), the device control wrapper unit 102*d* performs error processing and ends the processing.

If the device control wrapper unit 102*d* determines that the Rec data is appropriate (Yes at Step SF-2), the device control wrapper unit 102*d* shifts the processing to Step SF-3.

The device control wrapper unit 102*d* determines whether the scanner device type code contained in the Rec data and the scanner device type code contained in the operation information stored in the operation information file 106*a* match (Step SF-3).

If the device control wrapper unit 102*d* determines that the scanner device type codes do not match (No at Step SF-3), the device control wrapper unit 102*d* performs the error processing and ends the processing.

If the device control wrapper unit 102*d* determines that the scanner device type codes match (Yes at Step SF-3), the device control wrapper unit 102*d* shifts the processing to Step SF-4.

The device control wrapper unit 102*d* performs Rec data reading preprocessing (Step SF-4) and shifts the processing to Step SF-5.

The device control wrapper unit 102*d* determines whether request information as Sec data on the demonstration start request read from the device information folder 106*b* is image data (Step SF-5).

If the device control wrapper unit 102*d* determines that the request information is other than image data (other than image at Step SF-5), the device control wrapper unit 102*d* shifts the processing to Step SF-6.

The device control wrapper unit 102*d* outputs (displays) the information other than image data via the input/output unit 112 (Step SF-6) and ends the processing.

If the device control wrapper unit 102*d* determines that the request information is image data (image at Step SF-5), the device control wrapper unit 102*d* shifts the processing to Step SF-7.

The device control wrapper unit 102*d* performs sound effect outputting processing (Step SF-7). In other words, the device control wrapper unit 102d, after the folder check and the scanner device type code check, may reproduce a scanner operation sound based on the settings of the operation information.

Sound Effect Outputting Processing

Figure 15:
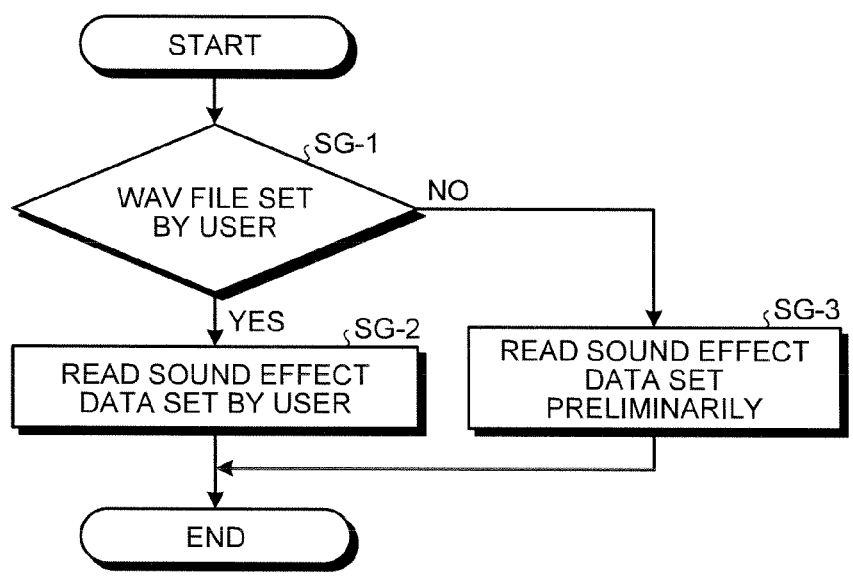
FIG. 15 is a flowchart showing an example of processing in the scanner demonstrator according to the present embodiment.
Figure 16:
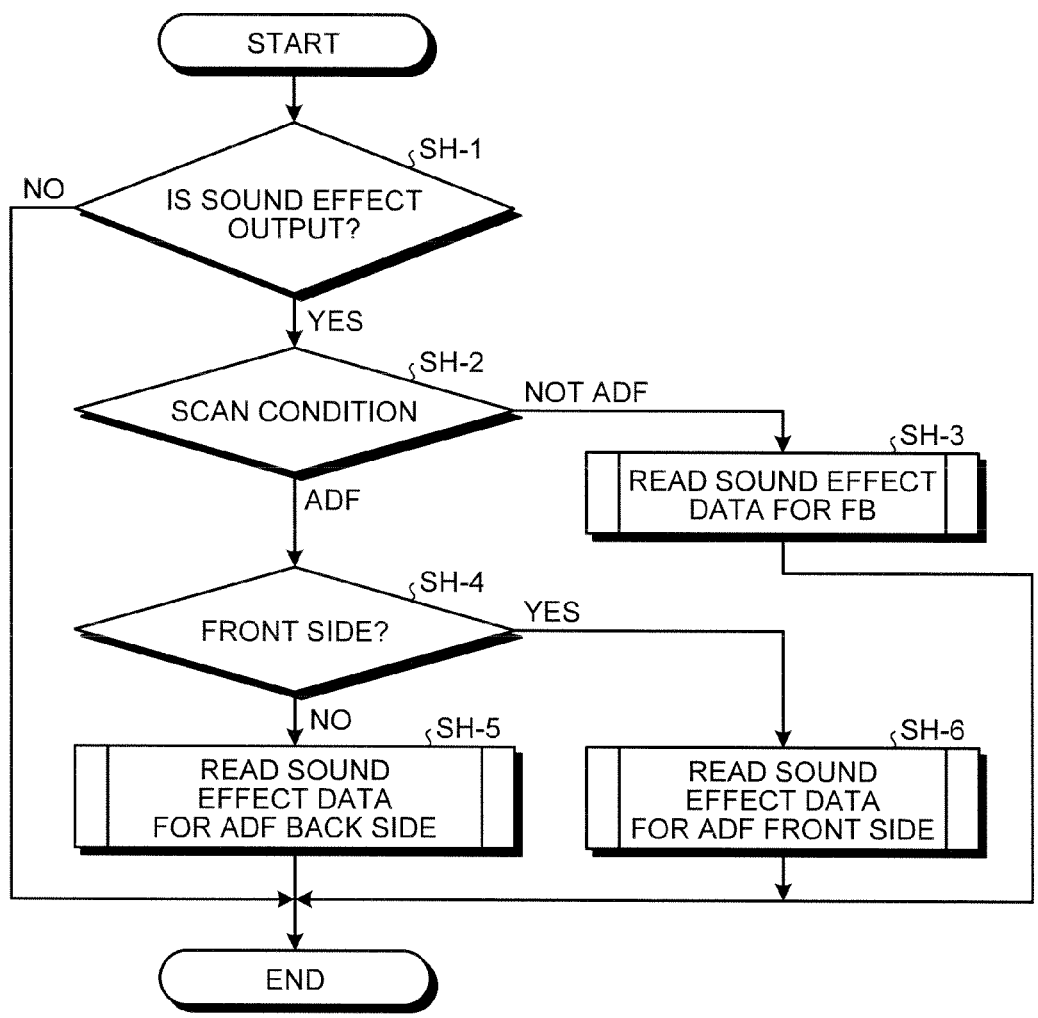
FIG. 16 is a flowchart showing an example of processing in the scanner demonstrator according to the present embodiment.
Figure 17:
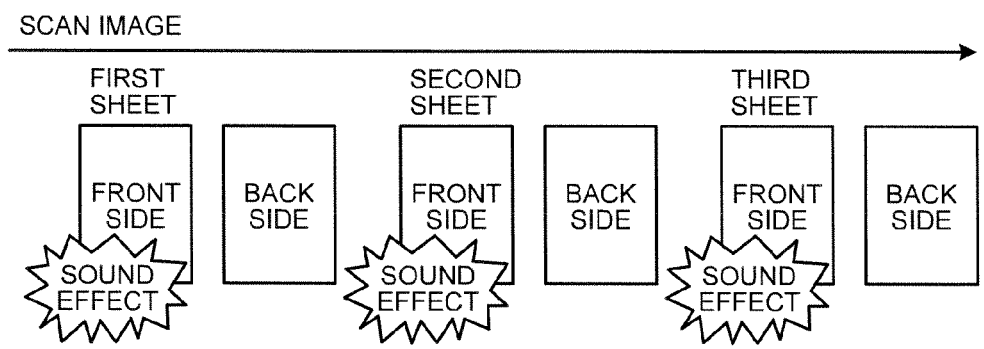
FIG. 17 is a diagram showing an example of sound effect output processing according to the present embodiment.

The following explains an example of sound effect outputting processing according to the present embodiment with reference to FIG. 15 through FIG. 17. FIG. 15 and FIG. 16 are flowcharts showing examples of processing in the scanner demonstrator 100 according to the present embodiment. FIG. 17 is a diagram showing an example of the sound effect outputting processing according to the present embodiment.

As shown in FIG. 15, the device control wrapper unit 102d determines whether there is any voice file (WAV file) set by a user based on the operation information stored in the operation information file 106a (Step SG-1).

If the device control wrapper unit 102d determines that there is a WAV file set by the user (Yes at Step SG-1), the device control wrapper unit 102d shifts the processing to Step SG-2.

The device control wrapper unit 102d reads the sound effect file (WAV file) set by the user from the device information folder 106b (Step SG-2) and ends the processing.

If the device control wrapper unit 102d determines that there is no WAV file set by a user (No at Step SG-1), the device control wrapper unit 102d shifts the processing to Step SG-3.

The device control wrapper unit 102d reads sound effect data (WAV file) set preliminarily from the storage unit 106 (Step SG-3) and ends the processing.

Next, as shown in FIG. 16, the device control wrapper unit 102d determines whether a sound effect is output based on the contents (the presence or absence of a sound effect, for example) set in the operation information stored in the operation information file 106a (Step SH-1).

If the device control wrapper unit 102d determines that no sound effect has been output (No at Step SH-1), the device control wrapper unit 102d ends the processing.

If the device control wrapper unit 102d determines that a sound effect has been output (Yes at Step SH-1), the device control wrapper unit 102d shifts the processing to Step SH-2.

The device control wrapper unit 102d determines a scan condition (ADF front/ADF back/flatbed) of image data to be output based on Rec data (image attribute information, for example) stored in the device information folder 106b (Step SH-2).

If the device control wrapper unit 102d determines that the scan condition of the image data is not ADF (flatbed) (not ADF at Step SH-2), the device control wrapper unit 102d shifts the processing to Step SH-3.

The device control wrapper unit 102d reads sound effect data for flatbed (FB) (Step SH-3) and ends the processing.

If the device control wrapper unit 102d determines that scan condition of the image data is ADF (ADF at Step SH-2), the device control wrapper unit 102d shifts the processing to Step SH-4.

The device control wrapper unit 102d determines whether the image data to be output is a front side based on Rec data (the image attribute information, for example) stored in the device information folder 106b (Step SH-4).

If the device control wrapper unit 102d determines that the image data to be output is a back side (No at Step SH-4), the device control wrapper unit 102d shifts the processing to Step SH-5.

The device control wrapper unit 102d reads sound effect data for the ADF back side (Step SH-5) and ends the processing.

If the device control wrapper unit 102d determines that the image data to be output is the front side (Yes at Step SH-4), the device control wrapper unit 102d shifts the processing to Step SH-6.

The device control wrapper unit 102d reads sound effect data for the ADF front side (Step SH-6) and ends the processing.

As shown in FIG. 17, when reading the sound effect data for the ADF front side, the device control wrapper unit 102d may cause the input/output unit 112 to display scan image data in accordance with an operation (a reading order, for example) of the scanner device 200 at reading and may voice output the sound effect data for the ADF front side corresponding to an operation (the reading of the front side of a first sheet document, a second sheet document, and a third sheet document) of the scanner device 200 via the input/output unit 112.

Thus, the present embodiment reproduces a sound effect, thereby improving the presence of a demonstration and improving impression of the user on the demonstration.

Returning back to FIG. 14, the device control wrapper unit 102d outputs (displays) the image data via the input/output unit 112 in an environment not connected to the scanner device 200 based on the device (detailed) status information (Step SF-8).

The device control wrapper unit 102d executes final image information setting processing based on the operation information (Step SF-9). In other words, the device control wrapper unit 102d may execute final image reporting adapted to the setting of scan through or scan endless in accordance with the settings of the operation information.

Final Image Information Setting Processing

The following explains an example of the final image information setting processing according to the present embodiment with reference to FIG. 18 through FIG. 24, FIG. 18 is a flowchart showing an example of processing in the scanner demonstrator 100 according to the present embodiment.

Figure 18:
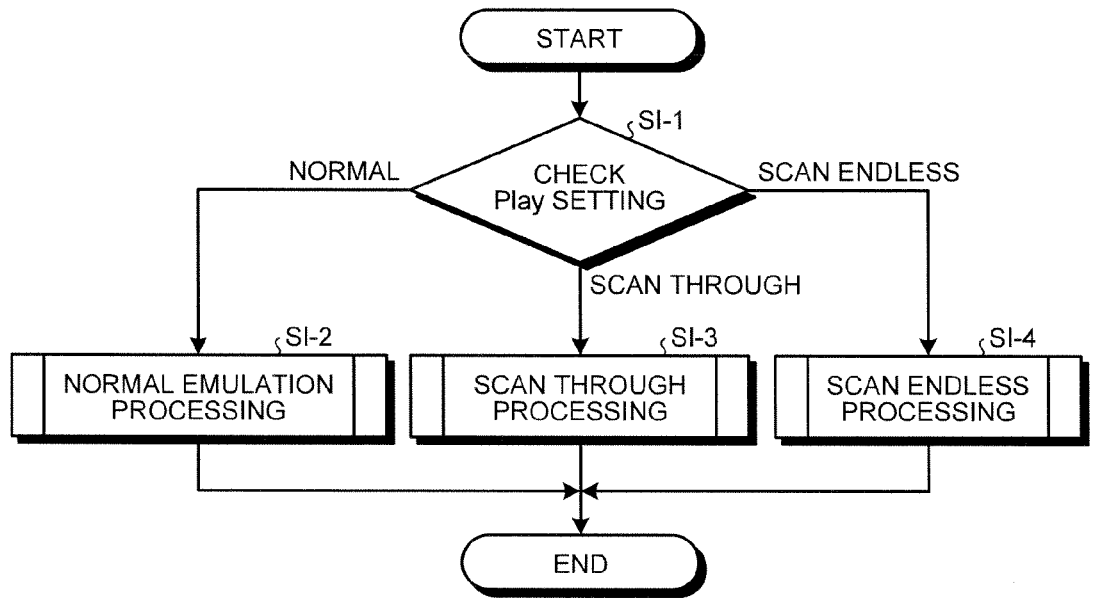
FIG. 18 is a flowchart showing an example of processing in the scanner demonstrator according to the present embodiment.

As shown in FIG. 18, the device control wrapper unit 102d checks a Play (detailed) setting (a reproduction mode, for example) based on the operation information stored in the operation information file 106a (Step SI-1).

If the device control wrapper unit 102d confirms that the reproduction mode is normal (normal at Step SI-1), the device control wrapper unit 102d shifts the processing to Step SI-2.

The device control wrapper unit 102d executes normal emulation processing (Step SI-2) and ends the processing.

Normal Emulation Processing

Figure 19:
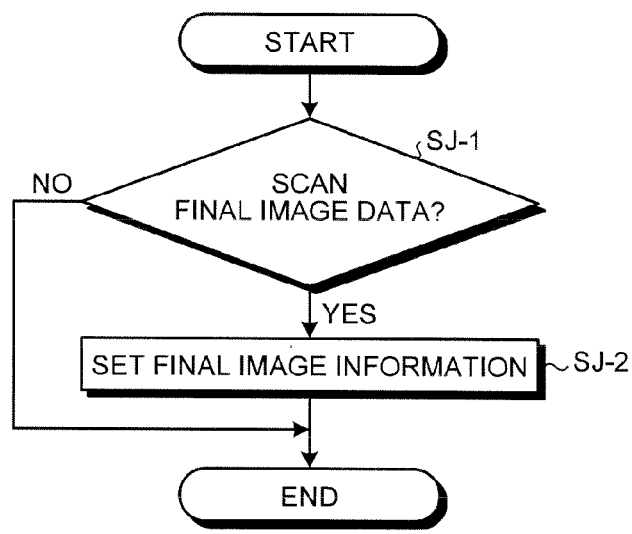
FIG. 19 is a flowchart showing an example of processing in the scanner demonstrator according to the present embodiment.
Figure 20:
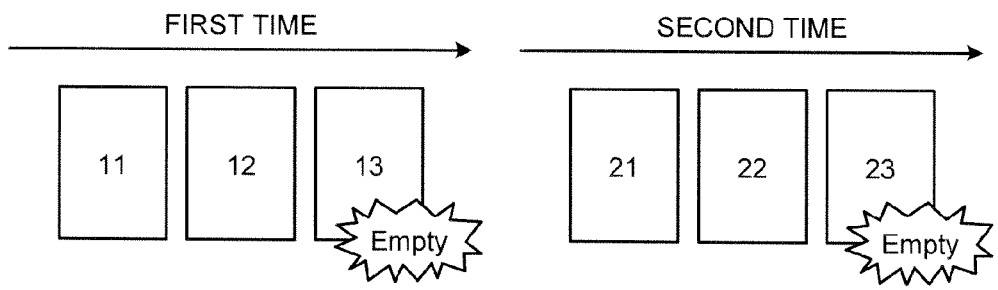
FIG. 20 is a diagram showing an example of normal emulation processing according to the present embodiment.

The following explains an example of the normal emulation processing according to the present embodiment with reference to FIG. 19 and FIG. 20. FIG. 19 is a flowchart showing an example of processing in the scanner demonstrator 100 according to the present embodiment. FIG. 20 is a flowchart showing an example of the normal emulation processing according to the present embodiment.

As shown in FIG. 19, the device control wrapper unit 102d determines whether the image data to be output is scan final image data, that is, image data on the final sheet of sheets set on a document table of the scanner device 200 (Step SJ-1) at image reading.

If the device control wrapper unit 102d determines that the image data to be output is not the scan final image data (No at Step SJ-1), the device control wrapper unit 102d ends the processing.

If the device control wrapper unit 102d determines that the image data to be output is the scan final image data (Yes at Step SJ-1), the device control wrapper unit 102d shifts the processing to Step SJ-2.

The device control wrapper unit 102d sets the image to be output to be final image information (Step SJ-2) and ends the processing.

As shown in FIG. 20, a sheet 13 and a sheet 23 correspond to the last one sheet (a sheet immediately before the document table is emptied) of sheets set on the document table of the scanner device 200 at image reading, and a sheet 21 corresponds to a sheet that is scanned when image reading is resumed after the sheets are set again on the document table.

When two times of image readings are performed with a pause interposed therebetween by the scanner device 200, the device control wrapper unit 102d sets the image data on the sheet 13 and the sheet 23 to be the final image information.

The device control wrapper unit 102d causes the input/output unit 112 to display the image data on a sheet 11, a sheet 12, and the sheet 13 in that order in accordance with image reading by the actual scanner device 200 based on the device status information and to perform output pausing processing (reporting of the absence of a sheet via the input/output unit 112, for example) in accordance with a pausing operation until image reading is resumed after the sheets are set again on the document table.

The device control wrapper unit 102d causes the input/output unit 112 to display the image data on the sheet 21, a sheet 22, and the sheet 23 in that order in accordance with image reading (scan resuming) by the actual scanner device 200 based on the device status information and ends the emulation processing.

Thus, the present embodiment can easily reproduce the operation of the pseudo-scanner device without managing individual pieces of image data, and a demonstration with higher reproducibility can be achieved by recording detailed information or the like of the scanner device 200.

Returning back to FIG. 18, if it determines that the reproduction mode is scan through (scan through at Step SI-1), the device control wrapper unit 102d shifts the processing to Step SI-3.

The device control wrapper unit 102d performs scan through processing (Step SI-3) and ends the processing.

Scan Through Processing

Figure 21:
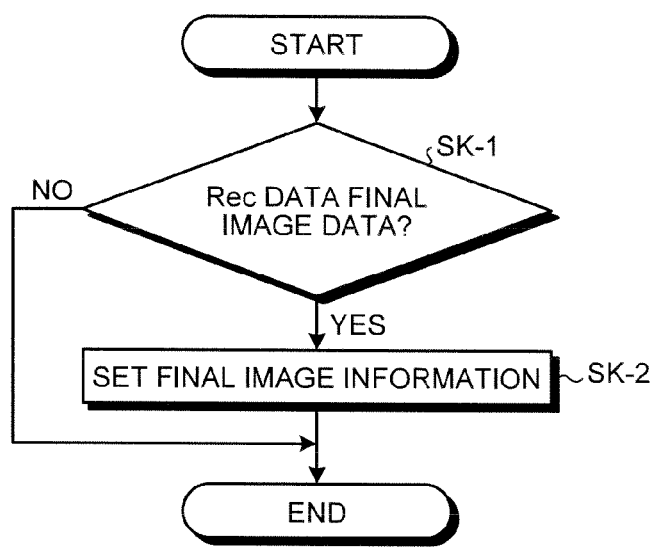
FIG. 21 is a flowchart showing an example of processing in the scanner demonstrator according to the present embodiment.
Figure 22:
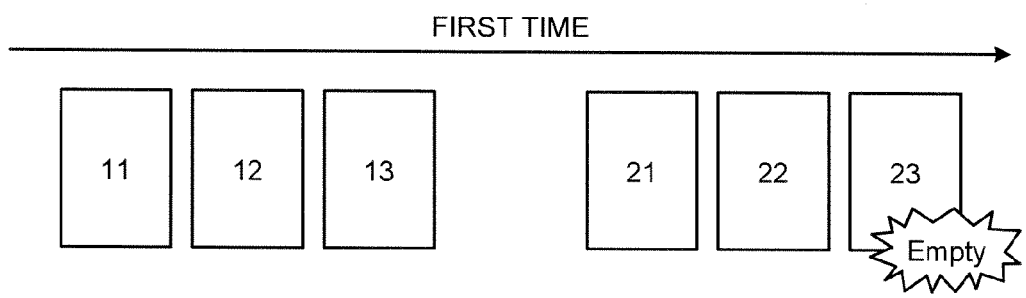
FIG. 22 is a diagram showing an example of scan through processing according to the present embodiment.

The following explains an example of the scan through processing according to the present embodiment with reference to FIG. 21 and FIG. 22. FIG. 21 is a flowchart showing an example of processing in the scanner demonstrator 100 according to the present embodiment. FIG. 22 is a diagram showing an example of the scan through processing according to the present embodiment.

As shown in FIG. 21, the device control wrapper unit 102d determines whether the image data to be output is Rec data final image data, that is, image data read by the scanner device 200 last on a time-series basis in Rec data (Step SK-1).

If the device control wrapper unit 102d determines that the image data to be output is not the Rec data final image data (No at Step SK-1), the device control wrapper unit 102d ends the processing.

If the device control wrapper unit 102d determines that the image data to be output is the Rec data final image data (Yes at Step SK-1), the device control wrapper unit 102d shifts the processing to Step SK-2.

The device control wrapper unit 102d sets the image data to be output to be final image information (Step SK-2) and ends the processing.

As shown in FIG. 22, when two times of image readings are performed with a pause interposed therebetween by the scanner device 200, the image data on the sheet 23 corresponds to the image data read by the scanner device 200 last on a time-series basis in Rec data.

The device control wrapper unit 102d may set the image data on the sheet 23 to be the final image information. The device control wrapper unit 102d causes the input/output unit 112 to display the image data on the sheet 11, the sheet 12, and the sheet 13 in that order in accordance with image reading by the actual scanner device 200 based on the device status information.

The device control wrapper unit 102d causes the input/output unit 112 to display the image data on the sheet 21, the sheet 22, and the sheet 23 in that order in accordance with image reading by the actual scanner device 200 after scan resuming without performing output pausing processing (reporting of the absence of a sheet via the input/output unit 112, for example) in accordance with the Pausing operation until image reading is resumed after the sheets are set again on the document table and ends the emulation processing.

This processing causes the present embodiment not to report the absence of a sheet or the like during outputting, and the emulation processing is performed as if the scan processing is continuing.

Thus, the present embodiment installs scan through functionality, thereby facilitating the preparation of demonstration data.

Returning back to FIG. 18, if the device control wrapper unit 102d confirms that the reproduction mode is scan endless (scan endless at Step SI-1), the device control wrapper unit 102d shifts the processing to Step SI-4.

The device control wrapper unit 102d executes scan endless processing (Step Si-4) and ends the processing.

Scan Endless Processing

Figure 23:
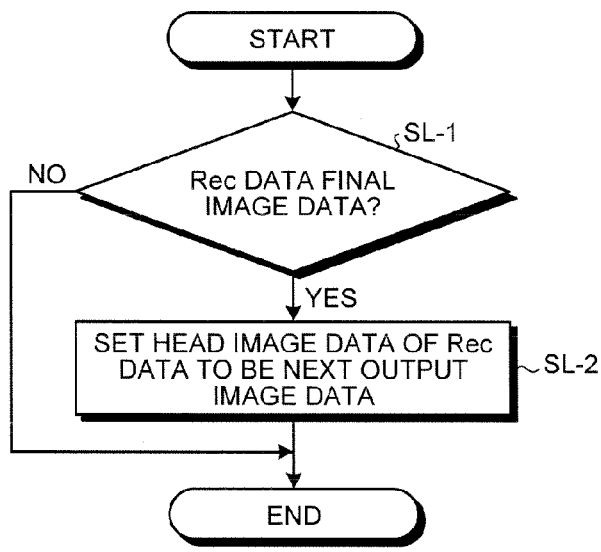
FIG. 23 is a flowchart showing an example of processing in the scanner demonstrator according to the present embodiment.
Figure 24:
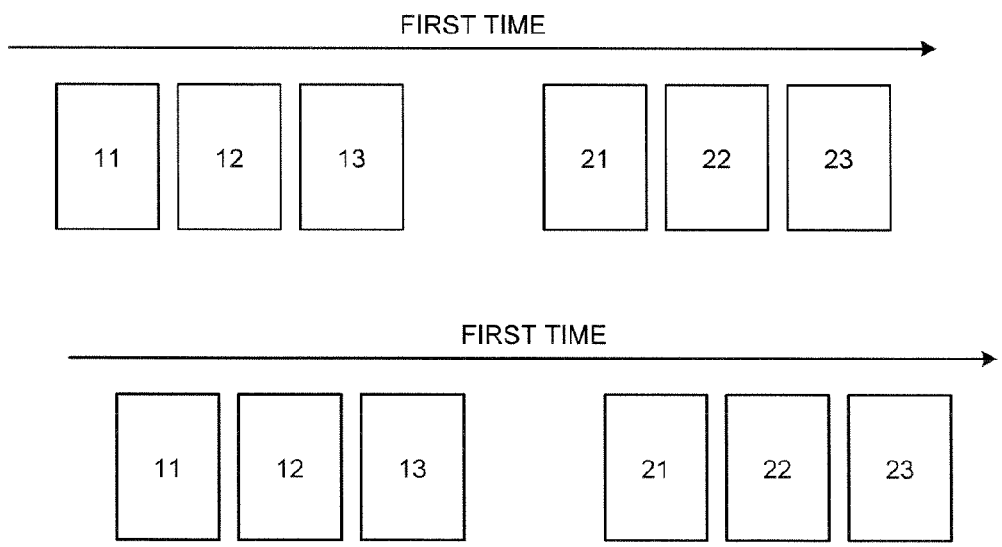
FIG. 24 is a diagram showing an example of scan endless processing according to the present embodiment.

The following explains an example of the scan endless processing according to the present embodiment with reference to FIG. 23 and FIG. 24. FIG. 23 is a flowchart showing en example of processing in the scanner demonstrator 100 according to the present embodiment. FIG. 24 is a diagram showing an example of the scan endless processing according to the present embodiment.

As shown in FIG. 23, the device control wrapper unit 102d determines whether the image data to be output is Rec data final image data, that is, image data read by the scanner device 200 last on a time-series basis in Rec data (Step SL-1).

If the device control wrapper unit 102d determines that the image data to be output is not the Rec data final image data (No at Step SL-1), the device control wrapper unit 102d ends the processing.

If the device control wrapper unit 102d determines that the image data to be output is the Rec data final image data (Yes at Step SL-1), the device control wrapper unit 102d shifts the processing to Step SL-2.

The device control wrapper unit 102d sets the head image data (on the time-series basis) of Rec data to be the next output image data (Step SL-2) and ends the processing.

As shown in FIG. 24, when two times of image reading are performed with a pause interposed therebetween by the scanner device 200, the image data on the sheet 23 corresponds to the image data read by the scanner device 200 last on a time-series basis in Rec data.

The device control wrapper unit 102d may set the image data on the sheet 11 to be the next output image data. The device control wrapper unit 102d causes the input/output unit 112 to display the image data on the sheet 11, the sheet 12, and the sheet 13 in that order in accordance with image reading by the actual scanner device 200 based on the device status information.

The device control wrapper unit 102d causes the input/output unit 112 to display the image data on the sheet 21, the sheet 22, and the sheet 23 in that order in accordance with image reading by the actual scanner device 200 after scan resuming without performing output pausing processing (reporting of the absence of a sheet via the input/output unit 112, for example) in accordance with the pausing operation until image reading is resumed after the sheets are set again on the document table.

The device control wrapper unit 102d executes the output of the image data on the sheet 11 through the sheet 23 repeatedly without ending the emulation processing.

This processing causes the present embodiment not to report the absence of a sheet or the like during outputting and to return to the head image upon reaching the end of Rec data, and the emulation processing is performed as if the scan processing is continuing endlessly.

Thus, the present embodiment installs scan endless functionality, thereby easily enabling a continuous operation of an application.

In other words, the present embodiment reproduces pseudo-continuous scan that cannot be achieved by the actual scanner device 200 in the operation of the virtual scanner device.

Returning back to FIG. 14, the device control wrapper unit 102d executes scan speed adjusting processing based on the operation information (Step SF-10) and ends the processing. In other words, the device control wrapper unit 102d may adjust scan speed based on time information of Rec data in accordance with the settings of the operation information.

Scan Speed Adjusting Processing

Figure 25:
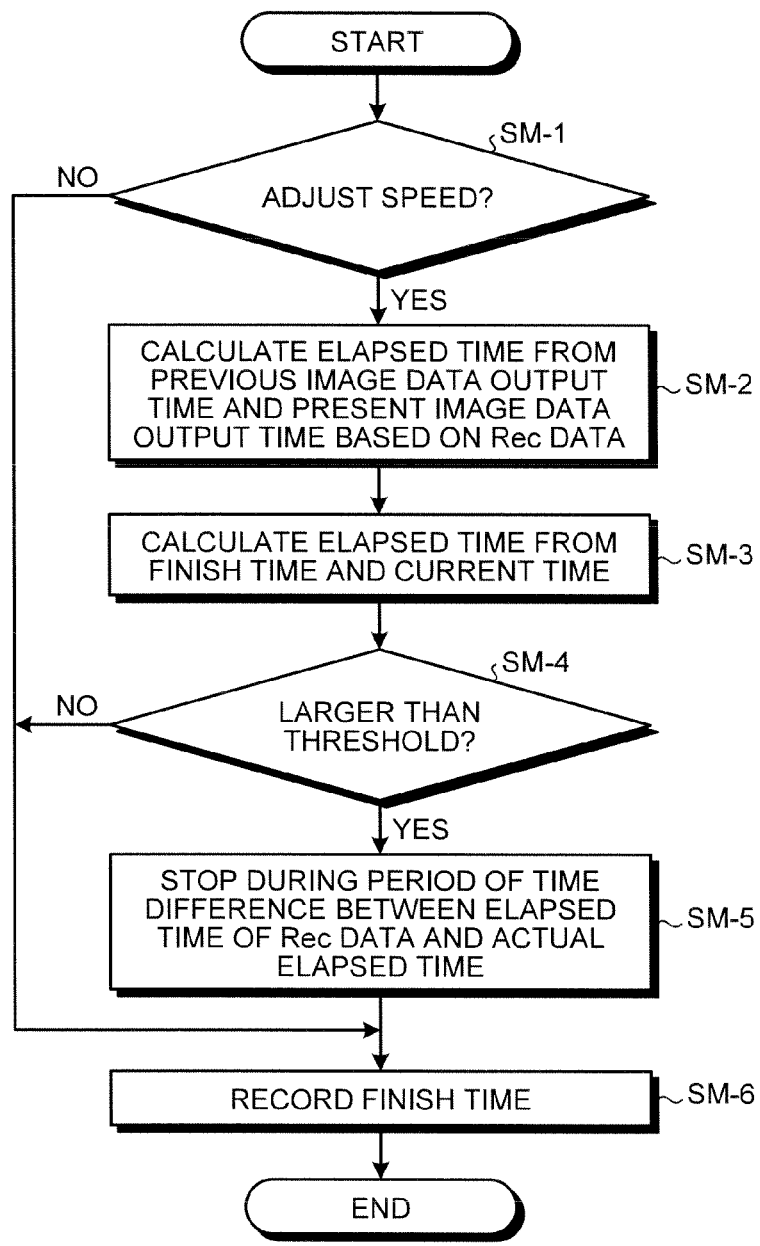
FIG. 25 is a flowchart showing an example of processing in the scanner demonstrator according to the present embodiment.
Figure 26:
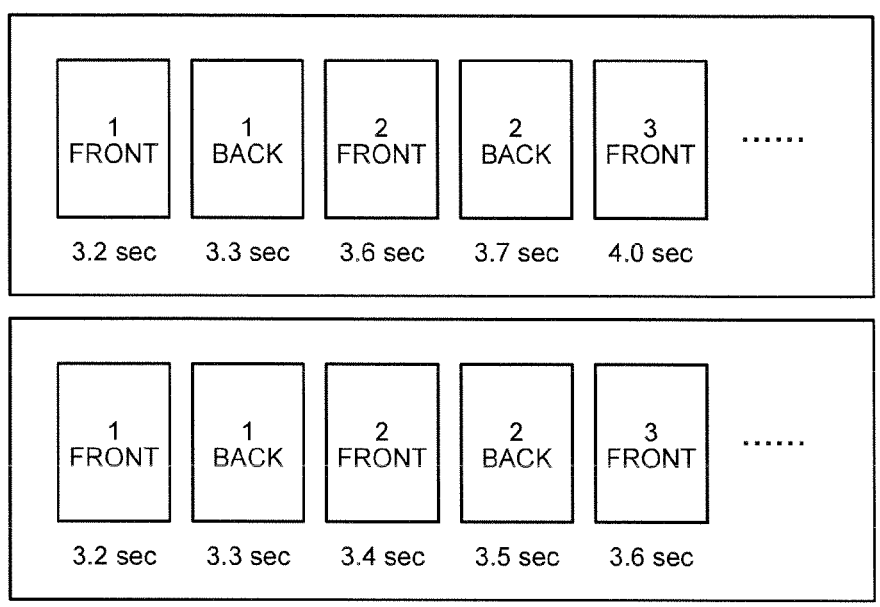
FIG. 26 is a diagram showing an example of scan speed adjusting processing according to the present embodiment.

The following explains an example of the scan speed adjusting processing according to the present embodiment with reference to FIG. 25 and FIG. 26. FIG. 25 is a flowchart showing an example of processing in the scanner demonstrator 100 according to the present embodiment. FIG. 26 is a diagram showing an example the scan speed adjusting processing according to the present embodiment.

As shown in FIG. 25, the device control wrapper unit 102d determines whether speed adjustment of image data output is performed based on the contents set (scan speed adjustment, for example) in the operation information stored in the operation information file 106a (Step SM-1).

If the device control wrapper unit 102d determines that the speed adjustment is not performed (No at Step SM-1), the device control wrapper unit 102d shifts the processing to Step SM-6.

If the device control wrapper unit 102d determines that the speed adjustment is performed (Yes at Step SM-1), the device control wrapper unit 102d shifts the processing to Step SM-2.

The device control wrapper unit 102d calculates an elapsed time from previous image data output time and present image data output time based on Rec data stored in the device information folder 106b (Step SM-2).

The device control wrapper unit 102d calculates an actual elapsed time from finish time of previous image data output and the current time (Step SM-3).

The device control wrapper unit 102d determines whether a value obtained by subtracting the actual elapsed time calculated at Step SM-3 from the elapsed time of Rec data calculated at Step SM-2 is larger than a certain threshold (Step SM-4).

If the device control wrapper unit 102d determines that the value is equal to or less than the threshold (No at Step SM-4), the device control wrapper unit 102d shifts the processing to Step SM-6.

If the device control wrapper unit 102d determines that the value is larger than the threshold (Yes at Step SM-4), the device control wrapper unit 102d shifts the processing to Step SM-5.

The device control wrapper unit 102d does not advance and stops the emulation processing (not changing display, for example) during a period of a time difference between the elapsed time of Rec data and the actual elapsed time (Step SM-5) and shifts the processing to Step SM-6.

The device control wrapper unit 102d records the finish time of the present image data output (Step SM-6) and ends the processing.

The upper diagram in FIG. 26 shows scan speeds (elapsed times) at actual image reading by the scanner device 200.

As shown in the lower diagram in FIG. 26, the device control wrapper unit 102d may cause the input/output unit 112 to display image data not in synchronization with the speed of the actual reading operation shown in the upper diagram in FIG. 26 based on the device status information.

In other words, as shown in the lower diagram in FIG. 26, in scan speed asynchronization functionality in the scanner demonstrator 100, the speed may be changed so as to output image data in 0.1 seconds without waiting for an actual elapsed time of 0.3 seconds from the back side of a sheet 1 to the front side of a sheet 2.

As shown in the lower diagram in FIG. 26, in the scan speed asynchronization functionality in the scanner demonstrator 100, the speed may be changed so as to output image data in 0.1 seconds without waiting for an actual elapsed time of 0.3 seconds from the back side of the sheet 2 to the front side of a sheet 3.

Figure 27:
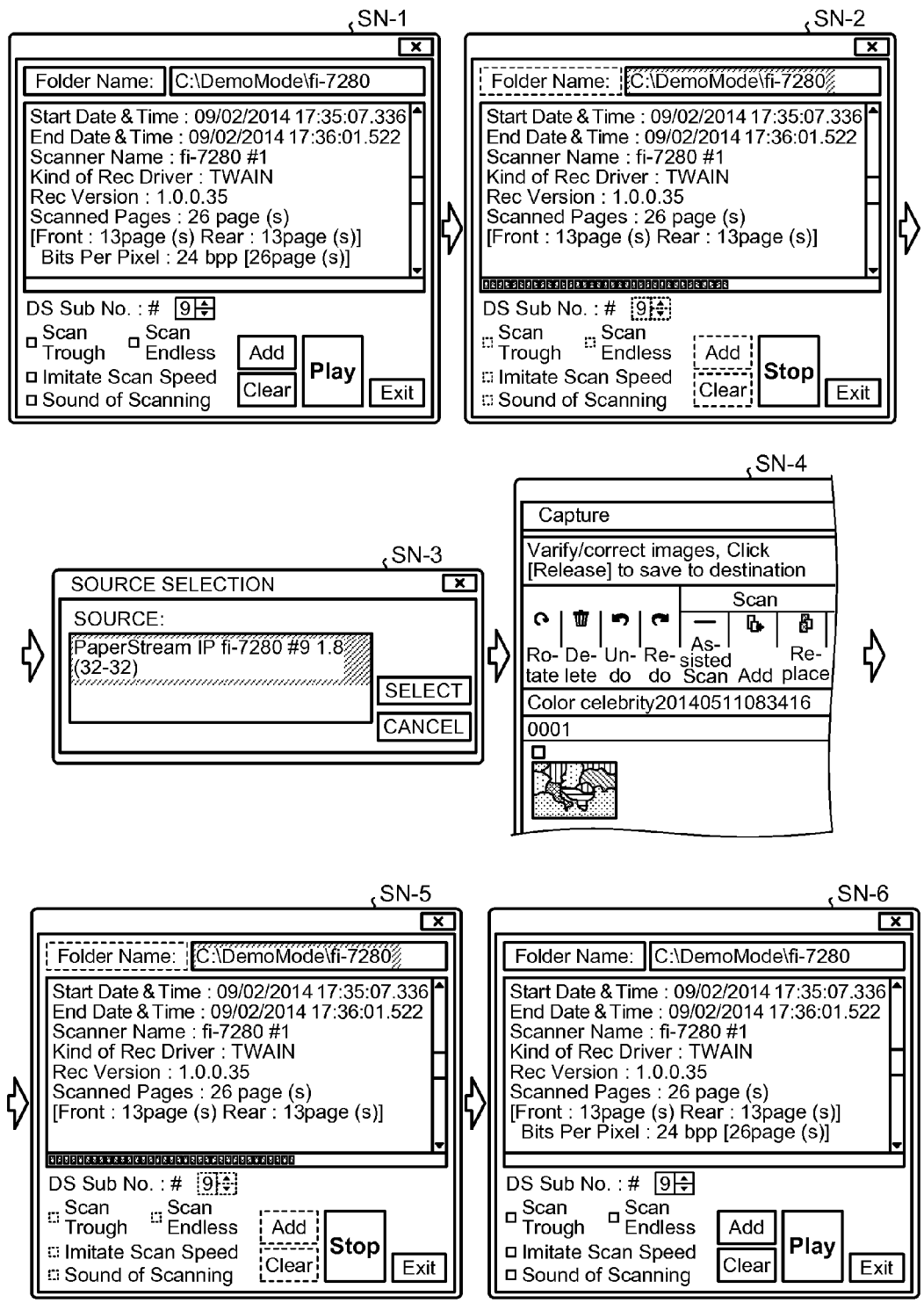
FIG. 27 is a diagram showing examples of screens when executing Play mode using the operation information setting tool according to the present embodiment.

The following explains an example of the execution of Play mode using the operation information setting tool according to the present embodiment with reference to FIG. 27. FIG. 27 is a diagram showing an example of a screen when executing Play mode using the operation information setting tool according to the present embodiment.

As shown in FIG. 27, the user designates a folder (the device information folder 106b) in which Rec data is stored via the input/output unit 112, and if a Play button is pressed down (Step SN-1), the scanner demonstrator 100 starts the Play mode processing (Step SN-2).

The scanner demonstrator 100 can use the scanner device 200 (a virtual device) when collecting Rec data even when the scanner device 200 is not connected, and if the user selects the virtual device via the input/output unit 112 (Step SN-3), demonstration processing of the scanner device 200 is executed (Step SN-4).

After the end of the demonstration processing by the scanner device 200, if the user presses down Stop button via the input/output unit 112 (Step SN-5), the scanner demonstrator 100 stops the Play mode (Step SN-6).

As shown in FIG. 27, the scanner demonstrator 100 displays a button (DS Sub No.) for designating a number to be added to a scanner device name, a checkbox (Scan Through) for setting scan through, a checkbox (Scan Endless) for setting scan endless, a checkbox (Imitate Scan Speed) for setting synchronization of scan speed with the actual scanner device 200, a checkbox (Sound of Scanning) for setting a sound effect, a button (Add) for adding a new scan image to a stored scan image, a button (Clear) for deleting a scan image, and a button (Play) for instructing the execution of Play mode as outlined information when executing Play mode.

Thus, the present embodiment has data addition functionality to Rec data (a function of adding new scan data to existing Rec data), and demonstration data can be easily created.

In the present embodiment, when acquiring the device ROM information, the device (detailed) status information, the device statistical information, and the image data, the device control wrapper unit 102d may, based on file information recorded in Rec data, read the file and report the same to the scanner driver.

Test Program Processing

Lastly, the following explains an example of test program processing according to the present embodiment with reference to FIG. 28. FIG. 28 is a flowchart showing an example of processing in the scanner demonstrator 100 according to the present embodiment.

As shown in FIG. 28, the test application unit 102f sorts combinations of registered profiles and pieces of Rec data based on the execution order information based on the profile correspondence table 106d (Step SO-1).

The test application unit 102f determines whether the combinations of the registered profiles and the pieces of Rec data are valid (Step SO-2).

If the test application unit 102f determines that any combination between the registered profile and Rec data is invalid (No at Step SO-2), the test application unit 102f shifts the processing to Step SO-2 if there are any registered combinations remaining and ends the processing if there are no registered combinations remaining.

If the test application unit 102f determines that any combination between the registered profile and Rec data is valid (Yes at Step SO-2), the test application unit 102f shifts the processing to Step SO-3.

The test application unit 102f switches to a profile designated by the scanner driver (Step SO-3). In other words, the test application unit 102f may set a profile holding the setting of the scanner driver in the scanner driver.

The test application unit 102f performs the setting of DemoMode (Step SO-4). In other words, the test application unit 102f causes the operation information setting unit (the operation information setting tool) 102a to set the operation information so as to use Rec data associated with the profile in Play mode.

The test application unit 102f causes the scanner device 200 to execute the scan processing, stores the acquired image data in a certain folder (Step SO-5), and shifts the processing to Step SO-2 if there are any registered combinations remaining and ends the processing if there are no registered combinations remaining.

Thus, the present embodiment records the detailed information or the like of the scanner device 200, thereby enabling a more highly reproducible test to be performed and enabling an operation test using the scanner device 200 to be automatically executed.

The scan endless functionality is installed in the scan test of the present embodiment, thereby enabling a load test in a continuous operation of an application to be easily performed.

The scan speed asynchronization functionality is installed in the scan test of the present embodiment, thereby enabling a scan operation to be simulated at the logically highest speed and enabling a load test on a high-order driver or an application to be easily performed.

The present embodiment coordinates pieces of Rec data and scanner settings (profiles), thereby enabling more patterns of tests to be automated.

In other words, the present embodiment can achieve pseudo-operation without connecting various scanner devices 200 in the operation of a virtual scanner device, thereby enabling scan tests of various settings to be automatically performed based on the association between the profile of the scanner and Rec data.

In the present embodiment, the test application unit 102f may execute a test application that acquires image data from the device controlling unit 102c, performs image processing and file storage based on the setting of a user application, and performs various patterns of operation tests while associating various profiles (reading settings of the scanner) and record data used in Play mode and automatically switching them separately in a test on the scanner driver unit 102b.

Thus, the present embodiment includes Rec mode that performs a demonstration and a test in advance using the scanner device 200 and collects image data and device status information at that time and stores them in a specific folder.

The present embodiment uses Rec mode, thereby enabling collection and management of image data, the operations of which had been complicated work, to be easily performed.

The present embodiment also includes a function of newly adding a scan result to existing Rec data, thereby enabling easy preparation of demonstration data.

This functionality enables the present embodiment to eliminate complicated collection and management of scanned image data and to perform functions that were able to be performed only by a specific scanner device 200 by a virtual scanner device through the collection and management of the device status information.

The present embodiment includes Play mode that creates a pseudo-scanner device based on the image data and the device status information collected in Rec mode and achieves image output similar to an actual scanner device 200 by the pseudo-scanner device.

The present embodiment can perform a more highly reproducible demonstration through the collection of the device status information.

This demonstration enables the present embodiment to solve the conventional problem in that when a demonstration for a specific device is performed, a scanner device adapted to the demonstration is required to be prepared, because there are many kinds of scanner devices 200, and functionality that can be performed differs device by device.

The present embodiment solves the conventional problem in that image data obtained by the scanner device 200 slightly differs by scan processing owing to factors such as distortion of a sheet when being conveyed, external light, contamination of rollers or lenses, and the like, which may change image processing results, and stable results cannot always be achieved in demonstrations depending on contents performed.

The demonstration in Play mode according to the present embodiment includes a scan speed synchronization function of causing the scan speed of the scanner device 200 to match the operational performance of the actual scanner device 200.

The present embodiment reproduces a sound effect of the operation of the scanner device 200, thereby enabling a demonstration having a more realistic presence to be performed.

Thus, the present embodiment reproduces a scanner operation sound and adjusts the operation of the virtual scanner device to the operation speed of the actual scanner device 200, thereby enabling demonstration having a more realistic presence.

This demonstration enables the present embodiment not to give the impression that an image is merely displayed to the side viewing the demonstration even when a demonstration is performed by a pseudo-scanner driver.

The present embodiment includes a function of outputting the image data collected in Rec mode a designated number of times or infinitely repeatedly, thereby enabling a continuous operation test to be automatically performed for tests on drivers and applications using the scanner device 200.

The present embodiment associates the image data and the device status information collected in Rec mode and the scan setting file with each other and provides functionality of automatic execution, thereby enabling tests of more scan settings to be automatically executed.

This functionality causes the present embodiment to eliminate the need to set sheets on the ADF of the scanner device 200 before the test, even when a test on the scanner device 200 equipped with an ADF is performed, because no actual device is used, and enables a continuous operation test and the automation of the test itself.

In view of the recent situation that strengthening of the functionality of drivers and applications (software) has been frequently performed rather than the strengthening of the functionality of the scanner device 200 itself and that demonstrations centering on software have become important, the present embodiment solves a conventional problem in that the scanner device 200 gathers much interest, but software functionality cannot gather sufficient attention in a demonstration using the scanner device 200.

Other Embodiments

The embodiment of the present disclosure is explained above. However, the present disclosure may be implemented in various different embodiments other than the embodiment described above within a technical scope described in claims.

For example, the scanner demonstrator 100 may perform processing on a stand-alone basis and may perform processing in response to a request from a client terminal (a separate body from the scanner demonstrator 100) and return the processing result to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the scanner demonstrator 100 and the scanner device 200 are merely conceptual and may not necessarily physically resemble the structures shown in the drawings.

For example, the process functions performed by each device of the scanner demonstrator 100 and the scanner device 200, especially each process function performed by the control unit 102, can be entirely or partially realized by a central processing unit (CPU) and a computer program executed by the CPU or by hardware using a wired logic. The computer program, recorded on a non-transitory tangible computer readable recording medium including programmed commands for causing a computer to execute the method of the present disclosure, can be mechanically read by the scanner demonstrator 100 as the situation demands. In other words, the storage unit 106 such as read-only memory (RUM) or HDD stores the computer program that can work in coordination with an operating system (OS) to issue commands to the CPU and cause the CPU to perform various processes. The computer program is first loaded to the random access memory (RAM), and forms the control unit in collaboration with the CPU.

Alternatively, the computer program can be stored in any application program server connected to the scanner demonstrator 100 and the scanner device 200 via any network, and can be fully or partially downloaded as the situation demands.

The computer program may be stored in a computer-readable recording medium, or may be structured as a computer program product. Here, the "recording medium" includes any "portable physical medium" such as a memory card, a Universal Serial Bus (USB) memory, an Secure Digital (SD) card, a flexible disk, an optical disk, a Read Only Memory (ROM), an EPROM (Erasable Programmable Read Only Memory), an Electronically Erasable and Programmable Read Only Memory (EEPROM), a Compact Disk Read Only Memory (CD-ROM), an Magneto-Optical (MO) disk, a (Digital Versatile Disk (DVD), and a Blu-ray (registered trademark) Disc.

In addition, a "program" is a data processing method that is described in any language or a description method and may have any form such as a source code, or a binary code. Furthermore, the "program" is not necessarily limited to a configuration of a single form and includes a configuration in which the program is configured with a plurality of modules or a plurality of program libraries in a distributed manner and includes a program that achieves the function thereof in cooperation with a separate program that is represented by an CS. In addition, as a specific configuration for reading data from a recording medium in each apparatus illustrated in the embodiments, a reading procedure, an installation procedure after the reading, and the like, a known configuration and a known procedure may be used.

The various kinds of databases or the like (the operation information file 106a, the device information folder 106b, the profile database 106c, and the profile correspondence table 106d) stored in the storage unit 106 are storage units such as any one, some, or all of a memory device such as a RAM and a ROM, a fixed disk device such as a hard disk, a flexible disk, and an optical disk and may store any one, some, or all of various kinds of computer programs, tables, databases, and files for web pages for use in various kinds of processing and providing websites.

The scanner demonstrator 100 may be structured as an information processing apparatus such as known personal computers or workstations, or may be structured by connecting any peripheral devices to the information processing apparatus. Furthermore, the scanner demonstrator 100 may be realized by mounting software (including computer programs, and data) for causing the information processing apparatus to implement the method according to the invention.

The distribution and integration of the device are not limited to those illustrated in the figures. The device as a whole or in parts can be functionally or physically distributed or integrated in any unit according to various attachments or how the device is to be used. That is, any embodiments described above can be combined when implemented, or the embodiments can selectively be implemented.

The present disclosure can easily perform a demonstration having high reproducibility and realistic sensation even without a scanner device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scanner demonstrator comprising:
a device information storage unit that stores image data read by a scanner device and device status information of the scanner device at image reading;
a profile storage unit that stores a profile on a setting of the scanner device at reading; and
a CPU and a storage storing a program,
wherein the program, when executed by the CPU, causes the CPU to:
output the image data read by the scanner and stored in the device information storage unit in an environment not connected to the scanner device, based on the device status information, thereby simulating a scanning operation of the scanner device, and
acquire a scan setting that associates the profile and the device status information with each other and performs a test on the scan setting, based on the scan setting.

2. The scanner demonstrator according to claim 1, wherein
the program, when executed by the CPU, further causes the CPU to acquire the image data read by the scanner device and the device status information and store the image data read by the scanner device and the device status information in the device information storage unit.

3. The scanner demonstrator according to claim 2, wherein
process configurations performed by the CPU are configured every time processing is started.

4. The scanner demonstrator according to claim 1, wherein
the program, when executed by the CPU, further causes the CPU to output a sound effect corresponding to an operation of the scanner device, based on the device status information.

5. The scanner demonstrator according to claim 1, wherein
the program, when executed by the CPU, further causes the CPU to output the image data in accordance with a reading operation of the scanner device at reading in an environment not connected to the scanner device, based on the device status information.

6. The scanner demonstrator according to claim 5, wherein
the program, when executed by the CPU, further causes the CPU to output the image data not in synchronization with speed of the reading operation.

7. The scanner demonstrator according to claim 1, wherein
the program, when executed by the CPU, further causes the CPU to continuously output the image data, with a reading completion operation of the scanner device at reading removed, in an environment not connected to the scanner device, based on the device status information.

8. The scanner demonstrator according to claim 1, wherein
the program, when executed by the CPU, further causes the CPU to output the image data in accordance with an operation of the scanner device at reading in an environment not connected to the scanner device, based on the device status information.

9. A method of scanner demonstration comprising:
an image storing step of acquiring image data read by a scanner device and device status information and storing the image data read by the scanner device and the device status information at image reading in a device information storage unit;
a scanning operation simulation step of outputting the image data read by the scanner device and stored in the device information storage unit, in an environment not connected to the scanner device, based on the device status information; and
a scan testing step of acquiring a scan setting that associates a profile on a setting of the scanner device at reading and the device status information with each other and performing a test on the scan setting, based on the scan setting.

10. The method of scanner demonstration according to claim 9, wherein
a sound effect corresponding to an operation of the scanner device is output based on the device status information at the scanning operation simulation step.

11. The method of scanner demonstration according to claim 9, wherein
the image data is output in accordance with a reading operation of the scanner device at reading in an environment not connected to the scanner device, based on the device status information at the scanning operation simulation step.

12. The method of scanner demonstration according to claim 11, wherein
the image data is output not in synchronization with speed of the reading operation at the scanning operation simulation step.

13. The method of scanner demonstration according to claim 9, wherein
the image data is continuously output, with a reading completion operation of the scanner device at reading removed, in an environment not connected to the scanner device, based on the device status information at the scanning operation simulation step.

14. The method of scanner demonstration according to claim 9, wherein
the image data is output in accordance with an operation of the scanner device at reading in an environment not connected to the scanner device, based on the device status information at the scanning operation simulation step.

15. A scanner demonstrator comprising:
a device information storage unit that stores image data read by a scanner device and device status information of the scanner device at image reading; and
a CPU and a storage storing a program,
wherein the program, when executed by the CPU, causes the CPU to:

output the image data read by the scanner and stored in the device information storage unit in an environment not connected to the scanner device, based on the device status information, thereby simulating a scanning operation of the scanner device; and output a sound effect corresponding to an operation of the scanner device, based on the device status information.

16. The scanner demonstrator according to claim 15, wherein the program, when executed by the CPU, further causes the CPU to acquire the image data read by the scanner device and the device status information and store the image data read by the scanner device and the device status information in the device information storage unit.

17. The scanner demonstrator according to claim 16, wherein process configurations performed by the CPU are configured every time processing is started.

18. The scanner demonstrator according to claim 15, wherein the program, when executed by the CPU, further causes the CPU to output the image data in accordance with an operation of the scanner device at reading in an environment not connected to the scanner device, based on the device status information.

19. A method of scanner demonstration comprising:

an image storing step of acquiring image data read by a scanner device and device status information and storing the image data read by the scanner device and the device status information at image reading in a device information storage unit; and a scanning operation simulation step of outputting the image data read by the scanner device and stored in the device information storage unit, in an environment not connected to the scanner device, based on the device status information, wherein a sound effect corresponding to an operation of the scanner device is output based on the device status information at the scanning operation simulation step.

20. The method of scanner demonstration according to claim 19, wherein the image data is output in accordance with an operation of the scanner device at reading in an environment not connected to the scanner device, based on the device status information at the scanning operation simulation step.

* * * * *